United States Patent
Deckoff et al.

(10) Patent No.: US 10,198,913 B1
(45) Date of Patent: Feb. 5, 2019

(54) CARD-BASED ELECTRONIC GAMING SYSTEMS AND TECHNIQUES FOR FIVE-CARD DRAW POKER

(71) Applicants: Generation Z, LLC, Columbus, MN (US); Stephen Deckoff, Columbus, MN (US)

(72) Inventors: Stephen Deckoff, Columbus, MN (US); Thomas W. Bowling, Jr., Los Angeles, CA (US)

(73) Assignee: Generation Z, LLC, Columbus, MN (US)

( * ) Notice: Subject to any disclaimer, the term of this patent is extended or adjusted under 35 U.S.C. 154(b) by 0 days.

(21) Appl. No.: 15/687,058

(22) Filed: Aug. 25, 2017

Related U.S. Application Data

(60) Provisional application No. 62/379,596, filed on Aug. 25, 2016.

(51) Int. Cl.
| | |
|---|---|
| *A63F 13/00* | (2014.01) |
| *G07F 17/32* | (2006.01) |
| *A63F 1/02* | (2006.01) |
| *A63F 13/213* | (2014.01) |
| *A63F 1/14* | (2006.01) |
| *A63F 13/245* | (2014.01) |
| *A63F 1/00* | (2006.01) |

(52) U.S. Cl.
CPC ............ *G07F 17/3293* (2013.01); *A63F 1/02* (2013.01); *A63F 1/14* (2013.01); *A63F 13/213* (2014.09); *A63F 13/245* (2014.09); *G07F 17/322* (2013.01); *G07F 17/3209* (2013.01); *G07F 17/3267* (2013.01); *G07F 17/3276* (2013.01); *A63F 2001/005* (2013.01)

(58) Field of Classification Search
None
See application file for complete search history.

(56) References Cited

U.S. PATENT DOCUMENTS

| | | |
|---|---|---|
| 5,200,890 A | 4/1993 | Pionchon |
| 6,508,709 B1 | 1/2003 | Karmarkar |
| | (Continued) | |

FOREIGN PATENT DOCUMENTS

| | | |
|---|---|---|
| WO | WO 2008/091809 | 7/2008 |

OTHER PUBLICATIONS

'www.linkedin.com' [online]. "Multi-hand MultiDraw Poker," Jul. 10, 2017 [retrieved on Jul. 25, 2017]. Retrieved from the Internet: URL<www.linkedin.com/pulse/multi-hand-multidraw-poker-timothy-nottke>. 10 pages.

*Primary Examiner* — Jason Yen
(74) *Attorney, Agent, or Firm* — Fish & Richardson P.C.

(57) ABSTRACT

In one implementation, an electronic five-card draw poker gaming system using common physical cards includes a plurality of physical playing cards; a scanner that is configured to identify each of the plurality of physical playing cards as they are dealt; a plurality of player computing equipment with graphical displays that are programmed to provide individualized gaming interfaces for a plurality of players; and a gaming computing system that is communicably connected to the scanner and the plurality of player computing equipment to determine five-card draw poker gaming outcomes for each of the plurality of players based on commonly dealt cards and player actions.

27 Claims, 15 Drawing Sheets

(56) References Cited

U.S. PATENT DOCUMENTS

| | | | |
|---|---|---|---|
| 8,113,934 B2 | 2/2012 | Moody | |
| 8,152,641 B2 | 4/2012 | Hill | |
| 8,192,267 B2 | 6/2012 | Acres | |
| 8,287,380 B2 | 10/2012 | Nguyen et al. | |
| 8,414,403 B2 | 4/2013 | Denham | |
| 8,425,298 B2 | 4/2013 | Moody | |
| 8,708,809 B2 | 4/2014 | Sanford | |
| 2003/0236113 A1* | 12/2003 | Webb | G07F 17/32 463/11 |
| 2005/0020338 A1 | 1/2005 | Stein | |
| 2008/0015030 A1 | 1/2008 | Baazov | |
| 2009/0111573 A1* | 4/2009 | Iddings | G07F 17/3244 463/25 |
| 2010/0117299 A1* | 5/2010 | Nicely | A63F 1/00 273/287 |
| 2010/0222132 A1 | 9/2010 | Sanford | |
| 2011/0195766 A1* | 8/2011 | Toompere | G07F 17/32 463/13 |
| 2013/0084962 A1* | 4/2013 | Radisich | G07F 17/3244 463/25 |
| 2013/0196777 A1* | 8/2013 | Hill | A63F 3/08 463/42 |
| 2016/0012663 A1* | 1/2016 | Chun | G07F 17/322 463/16 |
| 2016/0071366 A1 | 3/2016 | Lind et al. | |

\* cited by examiner though common drawn cards were generated). In a further example, if a third player discards all five cards from
CARD-BASED ELECTRONIC GAMING SYSTEMS AND TECHNIQUES FOR FIVE-CARD DRAW POKER

CLAIM OF PRIORITY

This application claims priority to U.S. Provisional Application Ser. No. 62/379,596, filed on Aug. 25, 2016, the entire contents of which are hereby incorporated by reference.

TECHNICAL FIELD

This document generally describes technology related to electronic gaming systems that use manually dealt physical cards to provide five-card draw poker gaming.

BACKGROUND

Poker is a game of skill with a large number of variations, including variations in the structure and format of the game play, player actions (e.g., betting, discarding and drawing new cards), and the determination of gaming outcomes (e.g., best hand among players who have not folded their hands wins, fixed schedule of payouts depending on hand). In general, poker games use a hierarchy of poker hands to compare player hands and to determine a winner (or winners in the case of multiple players having the same poker hand). One variation of poker is five-card draw, which itself has several variations. In general, five-card draw poker games involve dealing each player an initial hand of five cards, permitting each player to discard some or all of the cards in his/her initial hand, and then replacing the discards with newly drawn cards from the deck. Five-card draw poker gaming outcomes can be determined, for example, by evaluating the final poker hands for each player who has not folded by the time all gaming action (e.g., discards and drawing new cards, betting rounds) has been concluded and identifying a best poker hand (according to poker hand rankings, which range from a royal flush to a high card). Five-card draw poker gaming outcomes can also be determined by evaluating each player's resulting poker hand in isolation against one or more payout tables (instead of comparing player poker hands), such as tables that correlate particular poker hands to varying payout amounts/odds based on a bet amount.

Electronic gaming systems and equipment have borrowed the hierarchy of poker hands and assigned values to each of the hands to provide electronic gaming whereby players attempt to make poker hands with the greatest value and corresponding payout. Electronic gaming systems and equipment have been designed, for example, to provide a variation on five-card draw poker in which poker gaming equipment typically deal a player five cards and allow the player to discard anywhere from zero to all five of the cards in the initial hand. These electronic gaming systems then replace each of the discarded cards with additionally "drawn" card(s) and determine the outcome of the game (e.g., whether the player won and the odds that apply to the win) based on the final resulting hand as it is compared to the values assigned to the hierarchy of poker hands for the game.

SUMMARY

This document generally describes technology for electronic gaming systems for five-card draw poker that use physical cards (e.g., playing cards) to determine gaming outcomes. For example, electronic gaming systems can incorporate scanners (e.g., barcode scanners, QR code scanners, cameras (e.g., overhead cameras over the table), other optical scanners, RFID readers, other radio frequency scanners) that are able to accurately detect physical cards that are dealt and to use those dealt cards to provide electronic five-card draw poker gaming outcomes to users. Such gaming systems using card scanners to obtain physical card information may be referred to as "dealer assist" gaming systems.

While five-card draw poker using physical cards traditionally involves dealing each player at a table with his/her own cards to create a five-card poker hand, card-based electronic gaming systems for five-card draw poker can be programmed to deal common cards that are used by all players who are playing at a particular table, including cards that are drawn based on player actions. For instance, in one example of a five-card draw poker game provided with common cards via a dealer-assist electronic gaming system, a dealer (human or robot) can physically deal five cards (i.e., scan five physical cards from a deck/shoe of cards) that the system reads and applies as the initial base hand for each of the players at a table (physical and/or virtual table). The initial hand, which is the same for each player, can be presented on displays for each player (e.g., display equipment embedded in/attached to a gaming table, mobile display equipment), who can individually select which of the five cards they want to discard through an electronic user interface. An additional five common cards can then be physically drawn (from the deck/shoe) by the dealer, read by the system, and applied across the players' hands based on an order with which the common cards were drawn and a number of cards that were discarded by each player. For example, if a first player discards the first and fifth card from the initial hand, the first player's resulting hand will include the second, third, and fourth cards from the initial hand and the first and second drawn cards. In another example, if a second player discards no cards from the initial hand, then the second player's resulting hand will be the initial hand (even though common drawn cards were generated). In a further example, if a third player discards all five cards from the initial hand, then the third player's resulting hand will be the five drawn cards. Although each of these first-third players are playing using a common initial hand and common drawn cards, they each have different hands resulting from the discard and draw, and potentially different gaming outcomes.

In one implementation, an electronic five-card draw poker gaming system using common physical cards includes a plurality of physical playing cards; a scanner that is configured to identify each of the plurality of physical playing cards as they are dealt by a dealer; and a plurality of player computing equipment with graphical displays that are programmed to provide individualized five-card draw poker gaming interfaces for a plurality of players. The individualized five-card draw poker gaming interfaces can each be programmed to: output a virtual five-card draw poker hand for a corresponding player, and receive user input to perform one or more discard actions with regard to the virtual five-card draw poker hand. The system can further include a five-card draw poker gaming computing system that is communicably connected to the scanner and the plurality of player computing equipment. The five-card draw poker gaming computing system can be programmed to identify five of the physical playing cards that are detected by the scanner, the five of the physical playing cards being common across the plurality of players; assign the five of the physical playing cards as an initial five-card draw poker hand for each of the plurality of players; transmit the initial five-card draw poker hand to the plurality of player computing equipment; receive, from the plurality of player computing equipment, information identifying the discard actions performed by each of the plurality of players with regard to the initial five-card draw poker hand; identify next five of the physical playing cards that are detected by the scanner, the next five of the physical playing cards being common across the plurality of players; generate final five-card draw poker hands for the plurality of players based on the initial five-card draw poker hand, the discard actions performed by each of the plurality of players, and the next five of physical playing cards; and determine gaming outcomes for each of the plurality of players based on the final five-card draw poker hands.

Certain implementations may provide one or more advantages. For example, table-based five-card draw gaming can be provided to a large number of players from a single table. Traditional table games have a limited number of seats available for players. For example, poker-based table games may limit the number of players anywhere from five to eight players. In contrast, electronic gaming systems that are using common cards can allow participation of players at the physical table where the cards are being dealt as well as players who are remote from the table and/or connected to the table virtually. This can expand the number of players (beyond just those seated at the physical table) for a single table to include a large number of players who may be playing remotely from a location within a gaming facility (e.g., casino, card club, race track) and/or over the internet. Additionally, the number of players can be expanded without concern for the ratio of players to remaining cards in the deck/shoe. For example, conventional five-card poker uses a large number of cards per player—requiring a dealer's shoe/deck to have up to ten cards available for each player per hand, which can limit the number of players who are able to play each hand. Through common card five-card draw poker, a nearly limitless number of players can play each hand, which only requires up to ten cards total available per hand regardless of the number of players. This reduction in the resources, both physical (in terms of cards and dealer time to deal out each hand) and electronic (in terms of computing resources used to process game play, such as processor cycles, memory, network traffic, etc.), can make game play more efficient and faster. Additionally, even though common card five-card draw poker provides greater efficiencies, it still permits each player to individually make moves (e.g., designate cards to be discarded) regardless of whether they are seated at the physical table or remote, which can improve player engagement while maintaining gaming efficiencies.

In another example, electronic five-card poker gaming can be provided in jurisdictions (e.g., cities, counties, states, countries) that prohibit gaming outcomes based on random number generators and pseudo-random number generators. Conventional electronic five-card poker gaming, like electronic five-card draw poker equipment, has relied on computer-based random number generators and pseudo-random number generators to electronically determine which cards are dealt to players. Some jurisdictions prohibit the use of random and pseudo-random number generators to determine gaming action and outcomes—meaning that in those jurisdictions, conventional electronic five-card poker gaming, like electronic five-card draw poker equipment, is prohibited in gaming facilities. By providing five-card draw poker with common cards with dealer-assist electronic gaming systems, electronic poker gaming can be provided to players in these jurisdictions that prohibit random and pseudo-random number generators because the gaming action and outcomes are determined by physical cards that are physically dealt by a dealer.

In another example, the speed of five-card draw poker game play can be increased. For example, instead of waiting for each player to make moves and to receive additional cards, one or more common periods of time can be allocated for players to make moves and then a single set of replacement cards can be drawn by the dealer (instead of individual cards for each player). Accordingly, the amount of time that it takes for each hand of five-card draw poker to play out can be decreased and the game play can be improved. Additionally, by using common cards instead of individual cards, the number of cards that are used per hand can be decreased (e.g., decrease from up to 10 cards per player per hand to up to 10 cards total per hand regardless of the number of players), which can create greater efficiencies, can increase the number of hands that are able to be played per shoe, and decrease the amount of time that is spent switching between/shuffling shoes. Thus, the amount of time taken away from game play (due to shoe shuffling/replacement) can be reduced, the electronic and physical resources that are allocated per player can be reduced, and the amount of time dedicated to game play can be increased.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes a variety of different features, which can be selected and incorporated into gaming systems and equipment in various combinations. For example, different jurisdictions can have different gaming regulations outlining gaming features that are permitted within the jurisdictions. Features that are compliant with the gaming regulations for a jurisdiction can be implemented (e.g., activated, included) in gaming systems and equipment deployed in that jurisdiction, and other features that are not permitted within the jurisdiction can be deactivated/not included.

Figure 1:
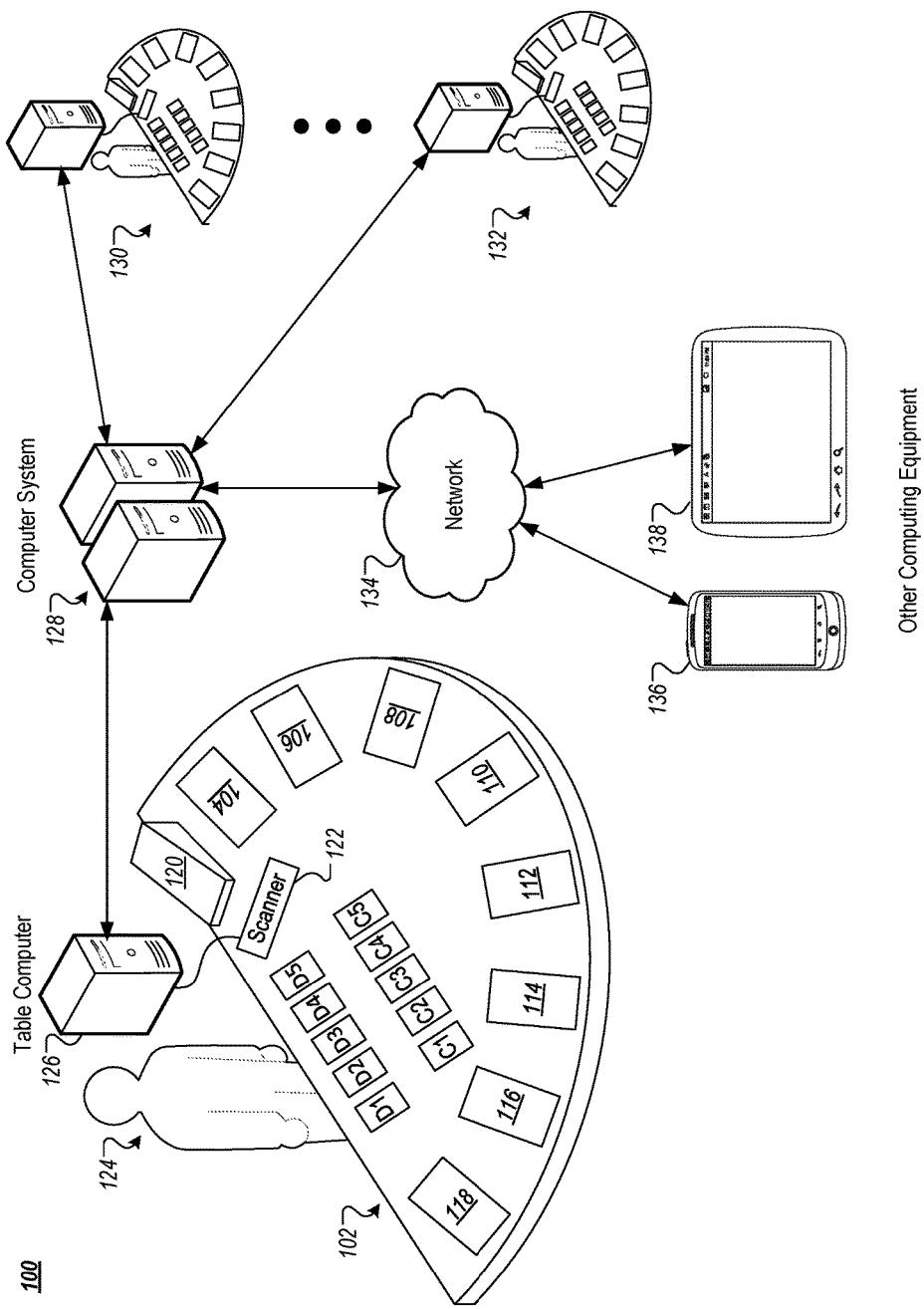
FIG. 1 is a conceptual diagram of an example card-based electronic five-card draw poker gaming system.

FIG. 1 is a conceptual diagram of an example card-based electronic five-card draw poker gaming system 100. The system 100 includes an example gaming table 102 that includes electronic displays 104-118 (e.g., touchscreens) that are located at each of the positions for the table 102. The table 102 also includes a scanner 122 that is configured to automatically detect cards that are dealt out of the shoe 120. The scanner 122 can be implemented in any of a variety of ways, such as an optical scanner that is configured to detect each card that is dealt from the shoe 120 through optical recognition of one or more unique portions of the cards (e.g., image recognition techniques to identify the suit and number for each card and/or to identify a code printed on each card, such as a barcode or QR code), radio frequency-based identification (e.g., recognition of RFID tags included in each card), and/or other identification techniques. In some implementations, the cards that are dealt out of the shoe 120 are specialized playing cards with one or more features (e.g., codes, RFID tags) that are specifically designed for detection by the scanner 122. In other implementations, the cards that are dealt out of the shoe 120 are standard playing cards without specially designed features.

Card-based electronic five-card draw poker gaming is provided at the table 102 through the use of table computer system 126 that, in combination with the scanner 122, detects the cards that are dealt from the shoe 120 by a dealer 124 (which can be a human, robot, or other mechanical dealing equipment/machine), manages gaming information and interactions through the electronic touchscreens 104-118, and determines gaming outcomes based on the cards that are dealt and the player actions (as designated through the electronic touchscreens 104-118). The shoe 120 can store one or more decks of physical playing cards that are ordered within the shoe 120 through physical shuffling of the cards (e.g., machine shuffling, manual shuffling, or a combination thereof). Through these collective parts (table 102, table computer system 126, scanner 122, shoe 120, dealer 124, electronic touchscreens 104-118) the system 100 can provide dealer assist electronic five-card draw poker gaming to players through the use of physical cards.

The table computer system 126 is programmed to use common cards to provide five-card draw poker gaming across the players through the electronic touchscreens 104-118. For example, the computing system 126 can detect an initial poker hand of cards C1-C5 dealt by the dealer 124 and can transmit information identifying the cards C1-C5 to the player electronic touchscreens 104-118. Each of the player electronic touchscreens 104-118, which can be any of a variety of computing system with an associated display (e.g., tablet computing equipment, embedded computing equipment), can present the initial hand C1-C5 to the players along with selectable options to discard some, none, or all of the cards C1-C5. For example, the electronic touchscreens 104-118 can present selectable buttons to discard or keep each of the cards C1-C5. In another example, the electronic touchscreens 104-118 can include physical buttons corresponding to each of the cards C1-C5 through which the player can designate which cards to keep or discard. Player actions can be maintained locally on the electronic touchscreens 104-118 and/or can be transmitted to the table computer system 126.

Once all player actions have been received and/or after expiration of a time period for players to enter their actions (e.g., 5 seconds, 10 seconds, 15 seconds, 20 seconds, 30 seconds), the dealer 124 can deal another set of cards D1-D5, which can be detected by the table computer system 126 (via the scanner 122) and applied across the players' hands based on their individual actions through the electronic touchscreens 104-118. The cards D1-D5 can be applied to each player's poker hand in an order in which they are dealt. For example, D1 can be applied for the first card discarded from the initial poker hand C1-C5, D2 can be applied for the second card discarded, D3 for the third, D4 for the fourth, and D5 for the fifth. So, if the player using electronic touchscreen 104 decided to discard one card from the initial poker hand C1-C5, then the discarded card is replaced with D1. Similarly, if the player using electronic touchscreen 106 decided to discard two cards from the initial poker hand C1-C5, then the discarded cards are replaced with D1 and D2, and so on. Example five-card draw poker hands using the system 100 with common cards are described below with regard to FIGS. 2A-B.

The table computer system 126 and/or the player electronic touchscreens 104-118 can determine the outcome of the game for each player based on the initial poker hand C1-C5, the player's actions (e.g., cards designated for discard), and the draw poker cards D1-D5. In some implementations, the table computer system 126 (in combination with a central computer system 128) can determine and manage gaming at each of the positions, and can simply use the electronic touchscreens 104-118 to present information to the players and to obtain player inputs (e.g., discard selections, bet amounts). In other implementations, each of the electronic touchscreens 104-118 can manage an individual player's gaming and can communicate with the table computer system 126 to receive card information. Other implementations are also possible.

The system 100 can additionally incorporate and permit remote players to play five-card draw poker on the table 102, such as through other computing equipment 136 and 138 (e.g., smartphones, tablet computers, wearable computing equipment (e.g., smart watches), desktop computers, laptop computers, media computers, virtual reality systems, augmented reality systems). For example, the system 100 can use the central computer system 128 to connect remote players with the table computer system 126 so that remote players can additionally participate in five-card draw poker gaming on the table 102. Such remote players may be located in the same facility as the table 102 (e.g., casino, card club, horse track) and/or remote from such a facility (e.g., located remotely, at home). Via the equipment 136 and 138, the remote players can connect to the computer system 128 and the table computer system 126 to participate in five-card draw poker gaming at the table 102 and/or other tables 130-132 over one or more networks 134, such as the internet, local area networks (LAN), wide area networks (WAN), virtual private networks (VPN), mobile data networks (e.g., 4G LTE networks), wireless networks (e.g., Wi-Fi networks, BLUETOOTH networks), and/or combinations thereof. The remote electronic equipment 136 and 138 can download and run code from the computer system 128 to provide electronic five-card draw poker gaming on the equipment 136 and 138 (e.g., provide user interfaces to establish/login to user accounts, to designate bet amounts, to present the initial poker hand C1-C5, to receive keep/discard action, to present the final hand based on the draw cards D1-D5, to determine gaming outcomes based on the final hand, and to allocate winnings to the player account). Such code can be, for example, a mobile application ("mobile app") that is downloaded and installed on the computing equipment 136 and 138, a browser-based application that is downloaded and run within a web browser application on the computing equipment 136 and 138, a standalone application that is downloaded and installed on the computing equipment 136 and 138, and/or other types of code and/or applications.

The computer system 128 can additionally allow players, such as local players using electronic touchscreens 104-118 and/or remote players using equipment 136-138, to bounce between gaming at tables 102 and 130-132, the play multiple hands simultaneously/concurrently across the tables 102 and/or 130-132, and to even combine common cards from multiple different tables 102 and 130-132 for a five-card draw poker hand. For example, a player can press a button requesting that the computer system 128 place him/her in the table that is going to be dealing next, so as to allow the player to minimize wait time. The computer system 128 can automatically transfer such a player to a table that is the first to scan a card in an initial poker hand, and can present the initial poker hand from that table to the player, even though the player may be located at another table or remote from the table. In another example, a player who locks in his/her discard selections early (at least a threshold amount of time before a selection time period will expire) may be given a draw (cards D1-D5) that from another table (e.g., table 130) that occurs sooner than the draw from the table (e.g., table 102) that dealt the initial poker hand C1-C5. In a further example, a player may be permitted to concurrently play multiple hands across the tables 102 and/or 130-132. Additionally, the computer system 128 may perform load balancing of players so as to more evenly distribute players across the tables 102 and 130-132.

The computer system 128 can additionally distribute video, audio, and/or chat feeds for the tables 102 and 130-132 to remote players using the computing equipment 136-138.

Figure 2A:
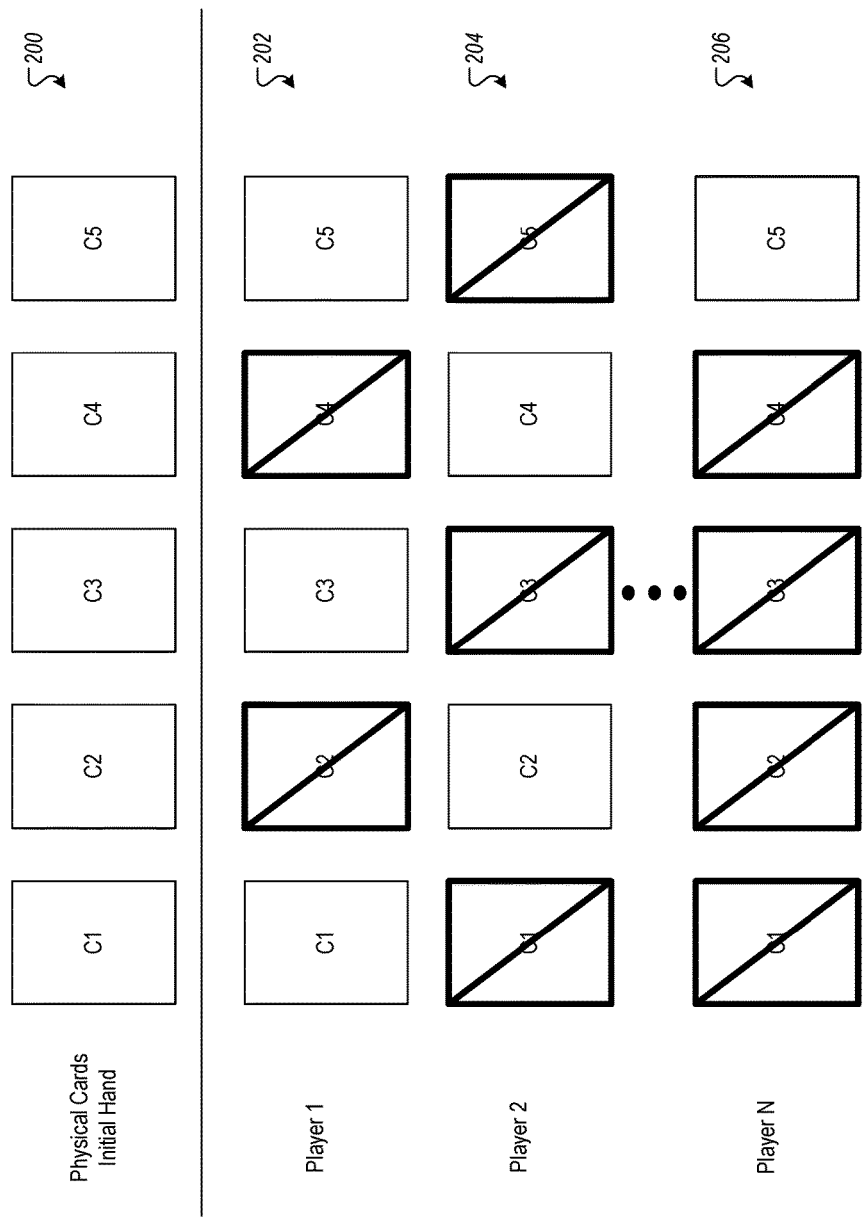
FIGS. 2A-B depicts example game play using common cards with an example card-based electronic five-card draw poker gaming system.
Figure 2B:
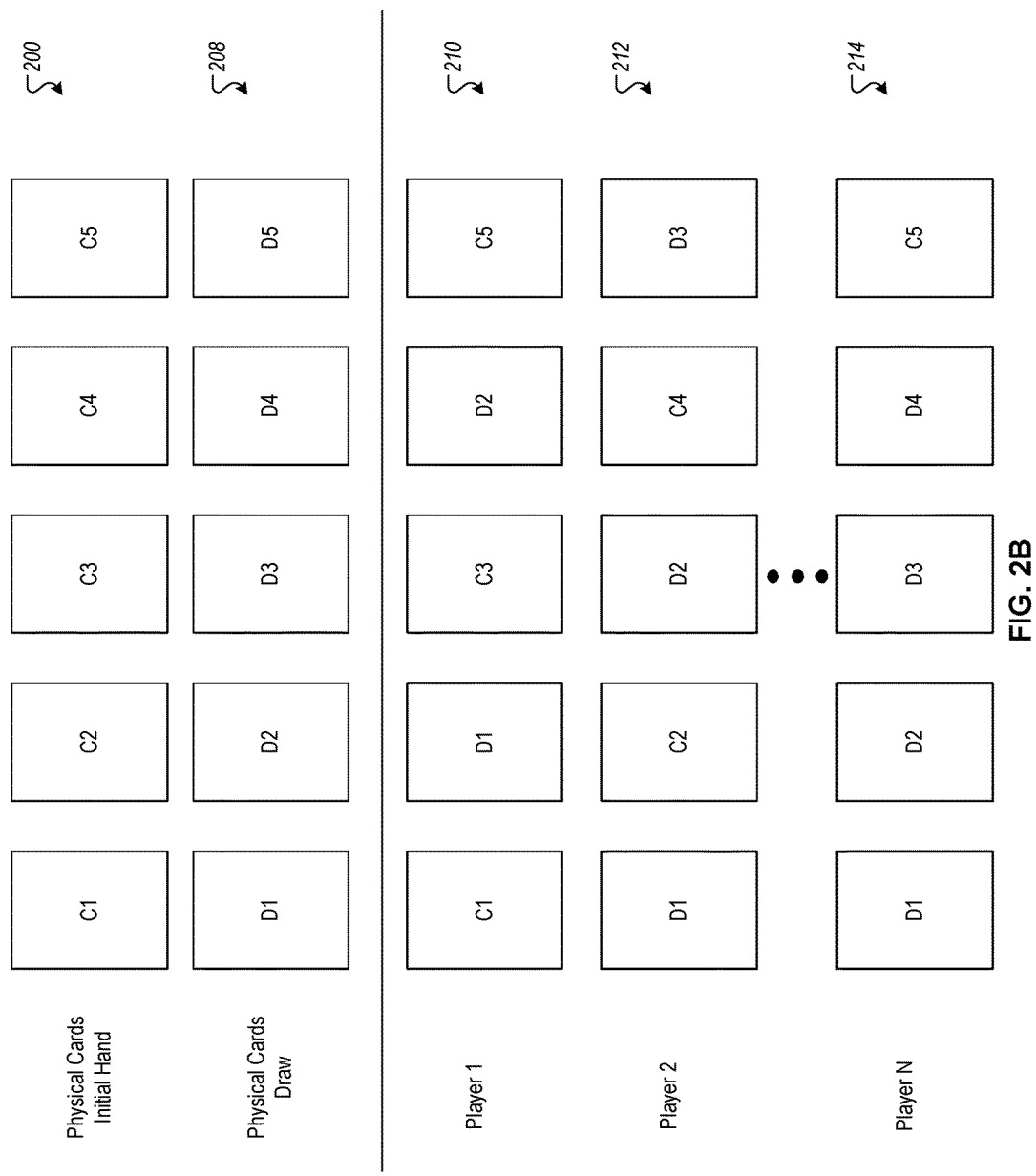

FIGS. 2A-B depicts example game play using common cards with an example card-based electronic five-card draw poker gaming system, such as the example system 100. Physical cards that are dealt by a dealer (e.g., dealer 124) and used commonly across multiple different players are presented above the line. Cards that are presented to example players 1-N on computing equipment, such as equipment 104-118 and 136-138, are presented below the line. FIG. 2A presents the initial five-card draw poker hand that is dealt to the players 1-N as well as the example actions that each of the players 1-N take with regard to the hand. For example, an initial five-card draw poker hand 200 of physical cards C1-C2 is dealt. This hand is presented to each of the players 1-N, as indicated by virtual hands 202-206 that are presented for each of these players. The example actions that are taken by the players 1-N vary, though. For instance, player 1 elects to discard C2 and C4 from his/her hand 202, whereas player 2 elects the opposite—discarding C1, C3, and C5 from his/her hand 204. The player N elects to discard C1-C4.

Referring now to FIG. 2B, additional physical cards D1-D5 are drawn 208. These cards are common for the draw across all of the player 1-N, and are assigned to the virtual poker hands of the players 1-N based on an order in which the cards D1-D5 were drawn. For instance, draw card D1 is provided in place of the first discard from a player's poker hand, draw card D2 is provided in place of the second discard, draw card D3 is provided in place of the third discard, draw card D4 is provided in place of the fourth discard, and draw card D5 is provided in place of the fifth discard. Accordingly, the resulting hands 210-214 for the players 1-N are depicted based on these techniques, which are implemented by the table computer system 126, the computing equipment 104-118 and 136-138, and the computer system 128. For instance, the final five-card draw poker hand 210 for player 1 includes cards C1, C3, C5, and D1-D2. The final five-card draw poker hand 212 for player 2 includes cards C2, C4, and D1-D3. The final five-card draw poker hand 214 for player N includes cards C5 and D1-D4. A player discarding no cards would have a final five-card draw poker hand of C1-C5 and a player discarding all cards would have a final hand of D1-D5.

An outcome for this example hand with each of the players 1-N is determined based on these final five-card draw poker hands 210-214. For example, a user with a pair may receive a 1:1 payout, a user with two pairs may receive a 3:2 payout, and a user with a royal flush may receive a 100:1 payout. Odds and outcomes can vary and can be determined using payout tables that correlate a hierarchy of poker hands to different payout odds. For example, the equipment 104-118 and 136-138 can permit players to select a type of five-card draw poker game (e.g., Jacks or Better, Tens or Better, Deuces Wild, Bonus Poker, Double Bonus Poker) that they are playing, which can each have different payout tables that provide different odds for different types of hands. In addition to having different gaming outcomes based on the cards that players decide to discard from their initial hand, a variety of other factors can additionally determine the outcome for the player and the payout odds, such as the type of game that a player selects to play, the bet amount relative to the minimum bet denomination (e.g., max bet amount for a game can have greater odds than the minimum bet amount), the location at which the game is being played (e.g., game in bar can use payout table with different odds than standalone gaming equipment/table on floor of race track), the type of equipment on which the game is being played (e.g., standalone gaming equipment/table can have greater odds than gaming provided on mobile computing equipment), whether the game is part of a progressive jackpot pool (e.g., electronic touchscreens part of a progressive pool that builds over time until a player gets a particular type of hand(s) can have different odds than electronic touchscreens that are not part of a progressive pool), and/or other factors.

For instance, under a Deuces Wild game, the player may not win the hand unless he/she attains a hand of three of a kind or better (with deuces being wildcards), whereas with the Jacks or Better game, the player may win the hand when he/she attains a pair of jacks or better—the payout table for these games correlates different hands within the hierarchy of poker hands to different outcomes and odds. The gaming outcome for players, and in particular the payout ratio, can depend on a bet amount and/or the location at which the game is being played (e.g., local at the table can have the highest payout, remote location within the gaming facility can have next highest payout, and remote connection outside the gaming facility can have lowest payout—other schemes are also possible). For example, many five-card draw poker games can permit a player to bet in increments of a minimum bet amount (e.g., $0.05/hand) up to a maximum bet (e.g., 5× maximum bet for maximum of $0.25/hand). However, the payout for some maximum bets (e.g., 5× bet) can be greater than the multiplier for the maximum bet. For instance, a royal flush may payout at 300:1 for a 1× bet of the minimum bet amount, whereas a royal flush may payout at 3000:1 for a 5× bet of the minimum bet amount, which is a 10× multiplier of the payout for a 5× multiplier of the bet amount. The equipment 104-118 and 136-138, the table computer 126, and/or the computer system 128 can be programmed to provide electronic five-card draw poker gaming outcomes to the players 1-N based on the initial poker hands C1-C5, the player discard actions, the draw poker cards D1-D5, the poker game selected by each player, and the bet amounts placed by each player.

The equipment 104-118 and 136-138 can be part of a pool of gaming systems that provide progressive jackpots, which are jackpots that build over time until a player gets a particular hand (e.g., royal flush, straight flush). For example, the electronic touchscreens 104-118 can be part of the same progressive pool that builds over time until a player at one of those electronic touchscreens 104-118 gets a particular hand that wins the progressive jackpot, such as obtaining a royal flush. There can be multiple different progressive pools across different groups of gaming systems.

Figure 3:
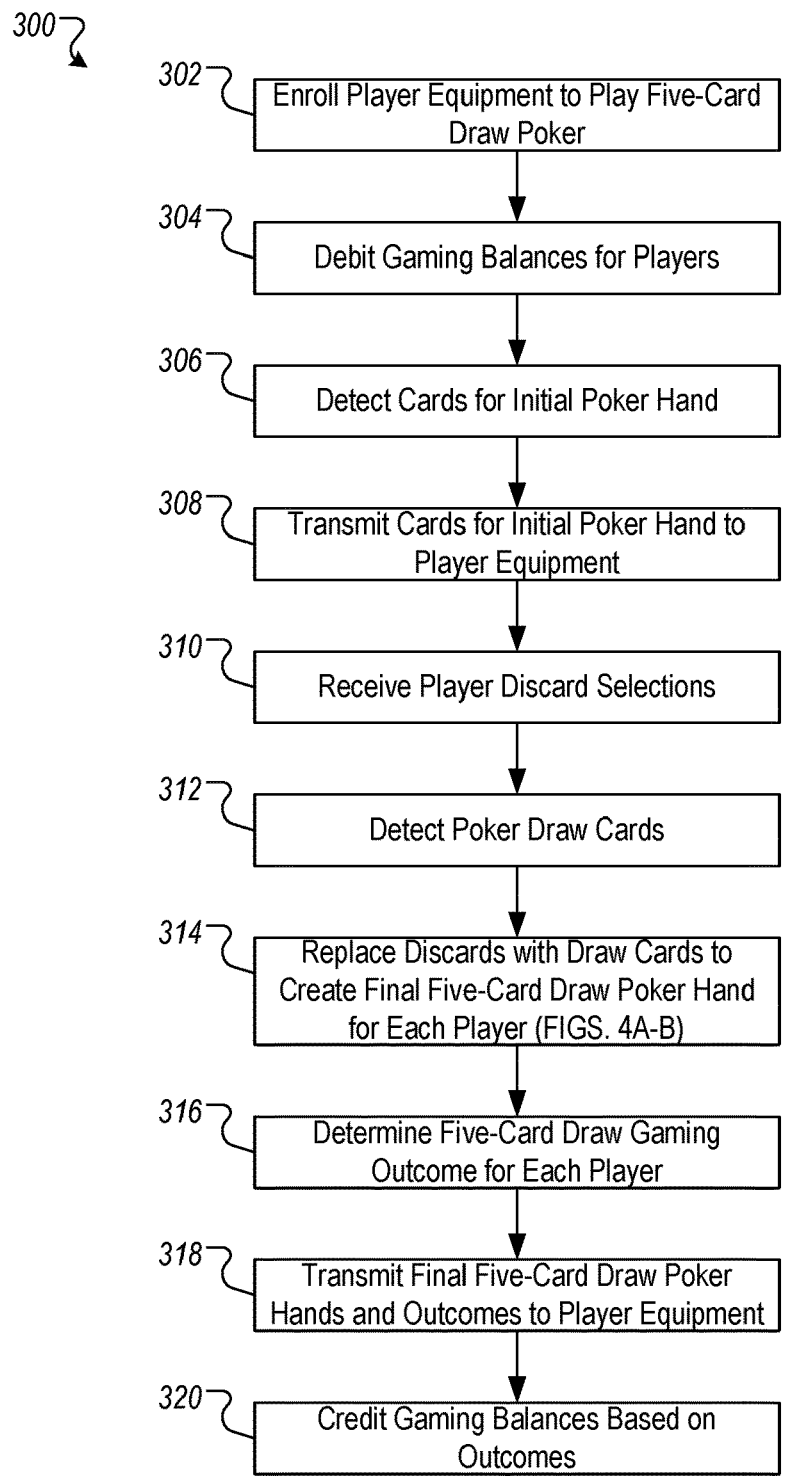
FIG. 3 is a flowchart of an example technique for performing card-based electronic five-card draw poker gaming.

FIG. 3 is a flowchart of an example technique 300 for performing card-based electronic five-card draw poker gaming. The example technique 300 can be performed by any of a variety of appropriate computing equipment and/or systems, such as the table computer system 126, the computing equipment 104-118 and 136-138, and the computer system 128.

Player computing equipment that are going to play a five-card draw poker game can be enrolled (302) and debits for playing the game can be taken against gaming balances for each of the players (304). For example, the computing equipment 104-118 and 136-138 can enroll with the table computer system 126 and/or the computer system 128 to play in a next hand of five-card draw poker on the table 102, and a debit/ante to play the game can be taken from each player's virtual gaming balance that is maintained on computing equipment 104-118 and 136-138, the table computer system 126, and/or the computer system 128.

Enrolling a new player can include, for example, the player either creating or providing player account information via the computing equipment 104-118 and 136-138. For example, a new player may create a new player account by physically and/or electronically depositing money via the computing equipment 104-118 and 136-138, the table computer system 126, and/or the computer system 128 (e.g., feeding physical money into a bill reader that is part of/connected to the computing equipment 104-118, providing credit/debit card information, providing bank account information). A unique account identifier can be created and funds deposited into the account can be credited to the account by the table computer system 126 and/or the computer system 128, for example, as part of a ticket-in ticket-out (TITO) system. Players with preexisting accounts can provide account information via the computing equipment 104-118 and 136-138 through one or more input mechanisms, such as through a physical ticket reader (e.g., ticket reader to read unique account identifier encoded on the ticket), through a player card reader (e.g., magnetic strip reader, RFID reader), through input of a username and password, and/or through other input mechanisms. New players can be prompted through one or more selectable options to designate a type of poker game they want to play and/or to designate a bet amount for the next five-card draw poker hand.

Enrolling existing players in a next five-card draw poker hand can include, for example, players either providing or not providing particular types of input within a threshold amount of time for the next hand to start. For example, in some instances players may have to opt-in to play a next hand, and can be provided with a time-limited selectable option to opt-in to game play for a next five-card draw poker hand at a table where the player just finished a hand. Failure to select the option within a threshold amount of time can cause the player to sit-out the next hand, although the player may be enrolled to play a next hand at another table. In other instances, player may have to opt-out to avoid repeating his/her bet in a next hand, and can be provided with a time-limited selectable option to opt-out of game play for the next five-card draw poker hand at a table. Failure to select the option within the threshold amount of time can cause the player to be automatically enrolled in the next hand at the same bet amount. Other opt-in and opt-out options are also possible, such as a player designating a bet amount for a next five-card draw poker hand as an implicit opt-in for a next five-card draw poker hand. Existing players can additionally be provided with selectable options between hands to change the type of game that they are playing between and/or to change their bet amount.

Physical cards that are going to be commonly shared across the players and their equipment as the initial poker hand for each player can be detected (306). For example, the table computer system 126 can detect five cards (the cards C1-C5) that are physically dealt by a dealer from the shoe 120 as the initial poker hand using the scanner 122. Information identifying the cards for the initial poker hand can be transmitted to the player equipment that are enrolled in the game (308). For example, the table computer system 126 can transmit information identifying the cards C1-C5 in the initial poker hand to the computing equipment 104-118 and 136-138, which can present the cards on the displays to the players along with selectable options through which the players can designate which cards they will hold and which cards they will discard. As discussed above, each player can be presented with the same initial poker hand, but can make individual game decisions so far as which cards are held and which cards are discarded. For example, players can employ different game play strategies, which may be dictated in part based on the type of poker game that each player has elected to play (e.g., some five-card poker games payout for a pair of cards whereas others only begin paying out with three of a kind) as well as the bet amount that each player has placed for the hand (e.g., some outcomes can pay at increased multipliers for higher bet amounts).

The players can provide their hold/discard selections for the initial poker hand to the computing equipment 104-118 and 136-138, which can then be transmitted to and received by the table computer system 126 (310). For example, discard selections can be received at the computing equipment 104-118 and 136-138, and transmitted to the table computer system 126. Additional physical cards that are part of a common draw across all of the players for the five-card draw poker hand are detected (312). For example, the table computer system 126 can detect the draw cards D1-D5 using the scanner 122. Like detecting the initial poker hand, the draw cards can include the next five cards that are physically dealt from the shoe 120 by the dealer. The dealer may burn the top card in the shoe 120 (e.g., withdraw the top card from the shoe 120 without running it past the scanner 122 for detection) and/or the table computer system 126 can automatically burn the top card in the shoe 120 (e.g., scanner 122 can disregard the top card and not reveal/use it to provide gaming action) before dealing the initial cards C1-C5 and/or the draw cards D1-D5 to ensure that players will not be able to identify the top card from the shoe 120 in the event that some of the cards are marked. The players can be given a common timer (e.g., 15 seconds, 20 seconds, 30 seconds) to make discard selections (step 310) before the dealer proceeds with dealing the draw cards (step 312). The player's discard selections at the expiration of this timer will be locked in and used for determining the resulting poker hand, in combination with the common draw cards. Players can be given the option to affirmatively "lock-in" their discard selections prior to expiration of the timer. If all players lock-in their discard selections in advance of the timer expiring, then the dealer can proceed with the draw cards without waiting for the timer to expire.

The common draw cards can be used to replace the discards to create a final five-card draw poker hand for each player (314). The draw cards can be used to replace the discards in any of a variety of ways, such as through the techniques described with regard to FIGS. 4A-B, 7. For example, the computing equipment 104-118 and 136-138, the table computer system 126, and/or the computer system 128 can replace the discarded cards from the initial poker hand for each player with the drawn cards in the order in which they were drawn, as discussed above with regard to FIGS. 1 and 2A-B.

In another example, the computing equipment 104-118 and 136-138, the table computer system 126, and/or the computer system 128 can replace the discarded cards from the initial poker hand for each player with the drawn cards using starting draw positions that are assigned to each player so that the starting position from which the draw cards are selected can vary across the players, as discussed below with regard to FIGS. 4B, 5A-B, and 6A-E. For instance, a first player can be assigned a starting draw position as the second draw card, which causes the draw cards to be inserted into open/discarded slots in the first player's hand starting with the second draw card and progressing sequentially through the remaining draw cards (third draw card→fourth draw card→fifth draw card→first draw card), as needed. However, a second player can be assigned a starting draw position as the fourth draw card, which causes the draw cards to be inserted into open/discarded slots for the fourth player's hand starting with the fourth draw card and progressing sequentially through the remaining draw cards (fifth draw card→first draw card→second draw card→third draw card), as needed. Accordingly, if the first player and the second player discard the same card from the initial hand, they will end up with different resulting poker hands. This can introduce variance in the resulting hands even though the players are playing from the same initial hand and the same draw cards, which can create varied outcomes and can mitigate risk to the house.

In another example, the players can each have an assigned order in which the draw cards are selected to replace the discards each player has selected, as described below with regard to FIGS. 7 and 8A-B. For instance, the first player may have an assigned order of the fifth card second card fourth card first card third card, and a second player may have the opposite assigned order of the third card→first card→fourth card→second card→fifth card. In this example, if each of the first and second players select the same two cards to discard, they will receive two different draw cards to replace those discards—the fifth and second draw cards for the first player and the third and first draw cards for the second player—and will end up with different resulting hands. The first and second players in this example will only receive the same draw card if they each select three or more discards, and will receive the same resulting hands only if they each discard all five cards in the initial hand. The order of draw cards can be assigned to each player in any of a variety of ways, such as through using one or more of the techniques described below with regard to FIGS. 6A-D.

The final five-card draw poker hands for each player can be evaluated and the five-card draw gaming outcome can be determined for each player (316). For example, the computing equipment 104-118 and 136-138, the table computer system 126, and/or the computer system 128 can determine which of the final five-card draw poker hands are winners and, if so, how much has been won by each player based on identification of the result of each of the final five-card draw poker hands (e.g., pair, three of a kind, full house, flush), the poker game that each player is playing, a comparison of each player's result with the winning hands for the game each player is playing (e.g., winning hands start at pair of jacks or better, winning hands start at three of a kind), and identification of odds for winning hands based on the type of winning hand and/or the bet amount. The determination of whether a player has won and how much the player has won can be made, for example, at the computing equipment 104-118 and 136-138, the table computer system 126, and/or the computer system 128. As discussed above, the determination of whether a player has won is based on the physical deal of the initial poker hand and the five draw cards, and the player gaming action (hold/discard selections).

Final hands and outcomes can be transmitted to and presented on the player computing equipment (318). For example, the computing equipment 104-118 and 136-138 can either generate and/or receive information identifying the final hands and the gaming outcomes (e.g., win, win amount, lose), and can output that information on the displays to the players. Gaming balances for players with winning hands can be credited (320). For example, the win amounts for players who have won based on the outcome of the final five-card draw poker hands can be credited to corresponding user accounts, which are identified by the unique identifiers described above. The technique 300 can be selectively repeated for each individual player—with each iteration of the technique 300 corresponding to a completed game of five-card draw poker using common cards.

As discussed above with regard to FIGS. 1 and 2A-B, the technique 300 can combine and/or transition between games on multiple different tables. For example, if a player has provided his/her discard selections (310) quickly and does not want to wait for the entire gaming action period for all players at the table to provide their discard selections (or for the time period for providing discard selections to expire), the player can select an option to receive five draw cards from another poker table. For instance, the player at electronic touchscreen 104 can enter his/her discard selections and then select an option to receive draw cards from another table, and can be provided with the draw cards from another table (such as the table 130 or 132). Those draw cards from the other table can be used to complete the player's final five-card draw poker hand, as described above, and to determine the gaming outcome for the user. Other ways (other than selecting an option to obtain draw cards from another table) for obtaining draw cards are also possible, such as the player providing his/her completed discard selections within a threshold period of time of the discard period starting or ending, the user designating that he/she is ready to receive draw cards, and/or other options.

In another example, players can similarly switch between tables upon completing a five-card draw poker game (switch to a new table after the end of one iteration of the technique 300 and before starting another iteration of the technique 300). For example, a player can designate that he/she is ready to start another five-card draw poker game and can select an option to be switched to another table that is starting a new game sooner than the present table, in response to which the player electronic touchscreen can be switched to gaming with cards dealt on another table. Other options for switching between tables are also possible, such as providing input (e.g., designating a bet for the new game) within a threshold period of time of a game ending/a new game starting, the user designating that he/she is ready to play a new game, and/or other options.

The system 100 and, particularly, the shoe 120 can be specifically adapted to provide for efficient and repeated five-card draw poker gaming, for example, using the technique 300. Five-card draw poker gaming may not be amenable to using multiple decks of cards that are all shuffled together and dealt from the shoe 120, as with other types of card-based gaming, like blackjack. In particular, when combining multiple decks of cards, there exists the possibility of the same card (same suit and card number) to be dealt multiple times within a single hand, and for a natural five of a kind hand to be dealt (five cards of the same value without wildcards). While multi-deck shoes can provide for more efficient repeated game play (e.g., no need to shuffle between each game), it may not be possible in five-card draw poker without significantly reducing player odds, which is less appealing to players. To maintain the same odds that are provided with conventional electronic five-card draw poker equipment and other electronic draw poker games while using physical cards in a configuration that allows for efficient and repeated game play, the shoe 120 and shuffling systems (e.g., automatic shuffling machines, human shufflers) can be adapted in a couple different ways. In one example, automatic shuffling machines can be adapted to receive multiple decks of cards, with each deck of cards being separated by a physical delimiter (e.g., plastic card separator, change in card orientation). The automatic shuffling machines can then shuffle each deck separately and output a stack of randomly shuffled decks, where each deck is separated by a physical delimiter. When dealing the cards from the shoe 120, the dealer 124 can deal ten cards from the first deck in the shoe 120 for the first five-card draw poker game and then discard the remainder of the cards from the first deck (at the conclusion of the first game), then deal ten cards from the second deck in the shoe 120 and then discard the remainder of the cards from the second deck, and so on until all of the decks have been dealt. By doing this, the dealer 124 can deal multiple five-card draw poker games without having to shuffle or obtain shuffled cards for each game, which can increase the pace of game play, and without having to resort to using multiple decks of cards, which could lower player odds for the game.

In another example, automatic shufflers can be adapted to output the first ten cards from each deck for placement in the shoe 120 (instead of the entirety of each deck) and then the dealer 124 can simply deal five-card draw poker games using the technique 300. By doing this, the game play can be made even more efficient by not requiring the dealer 124 to remove the remainder of the deck before starting a next game. This can present potential problems with keeping decks of cards separate from each other, which can be accomplished by marking cards with a unique identifier for the deck to which the card belongs (in addition to each card in a deck being marked with an identifier for the card (suit, card number)). An automatic shuffler can be programmed to receive a group of cards from mixed decks, to separate the cards into their respective decks based on the deck identifiers, and then to shuffle each deck separately from the other decks. If a deck is found to be incomplete after receiving all available cards, the cards from that deck can be discarded as being part of an incomplete deck. By doing this, the dealer 124 can more efficiently deal multiple five-card draw poker games without having to shuffle or obtain shuffled cards for each game, which can increase the pace of game play, and without having to resort to using multiple decks of cards, which could lower player odds for the game.

Automatic shufflers and the system 100 can additionally and/or alternatively be adapted to shuffle and use decks with greater than 52 cards, such as decks that include one or more jokers. Each table can include one or more automatic shufflers, such as tables having two, three, or more automatic shufflers to concurrently shuffle multiple decks of cards. Shufflers can be configured to output cards in groups, such as outputting sets of five cards together that can be used as the initial hand and the draw cards. The automatic shufflers can accommodate one or more decks at a time.

Figure 4A:
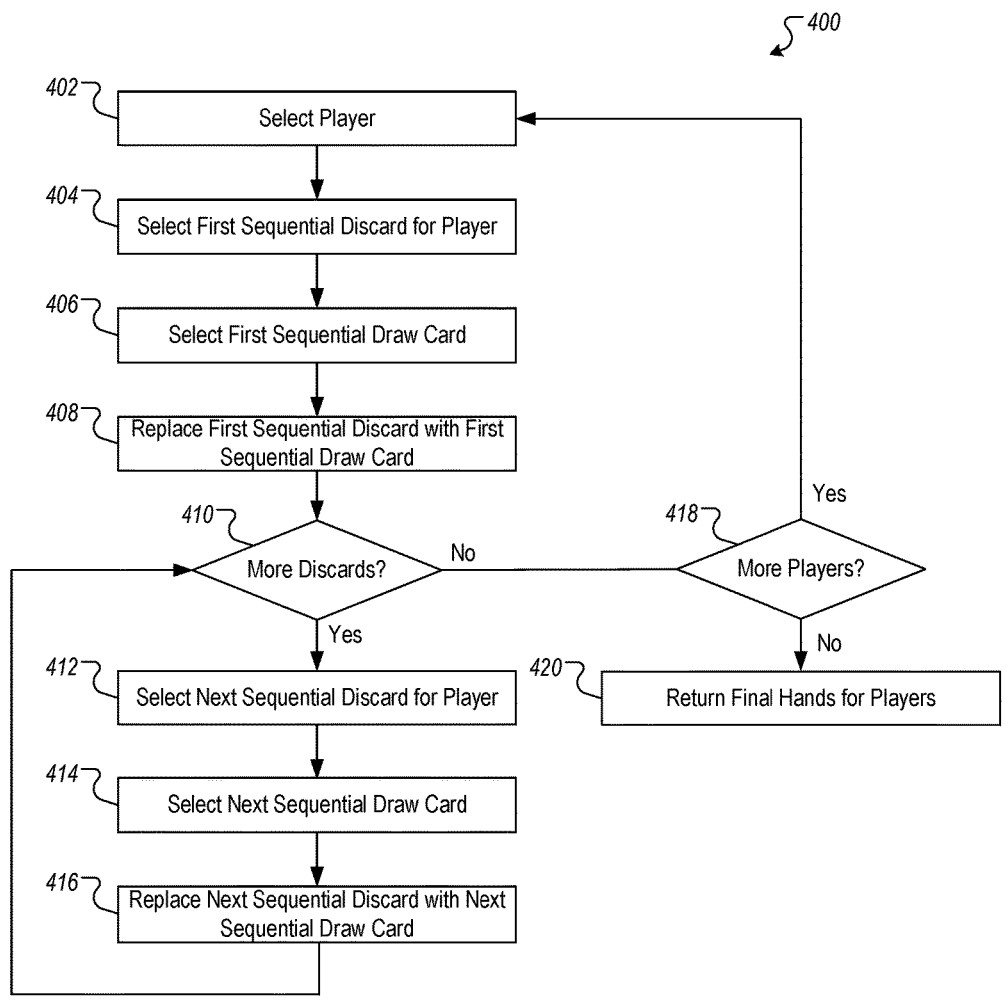
FIGS. 4A-B are flowcharts of example techniques for replacing discards in player hands from common draw cards to generate a final resulting hand for each player.
Figure 4B:
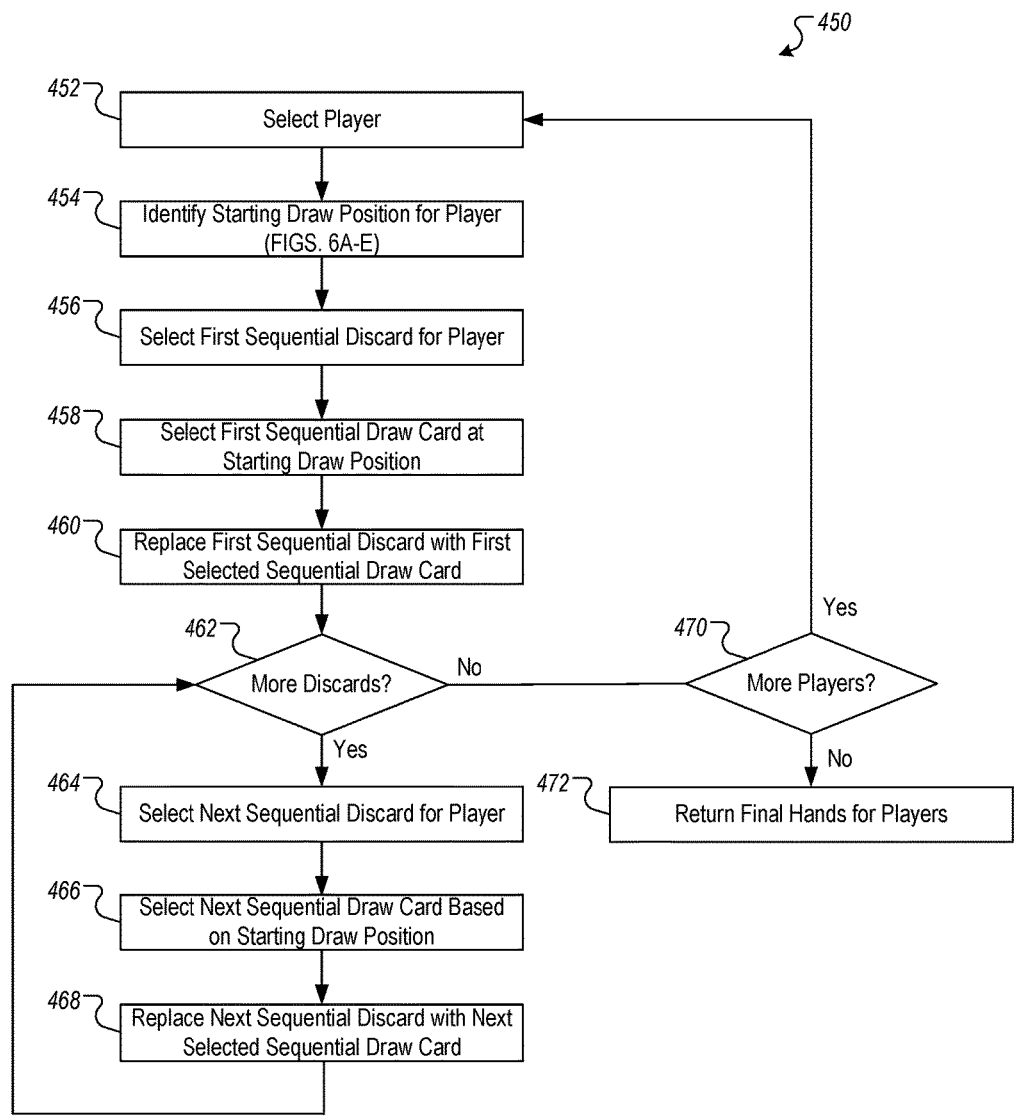

FIGS. 4A-B are flowcharts of example techniques 400 and 450 for replacing discards in player hands from common draw cards to generate a final resulting hand for each player. The example techniques 400 and 450 can be performed by any of a variety of appropriate computing equipment and/or systems, such as the table computer system 126, the computing equipment 104-118 and 136-138, and the computer system 128. The techniques 400 and 450 can be performed, for example, as part of step 314 in the technique 300, as described above with regard to FIG. 3.

Referring to FIG. 4A, the example technique 400 involves sequentially slotting the common draw cards into open spots on each player's hand resulting from discards from the initial poker hand, starting with a first dealt common draw card (first draw card) and concluding with the last dealt common draw card (fifth draw card). The five common draw cards can be viewed as each having a position that is established based on the order in which the draw cards were dealt. The common draw cards can be allocated to player hands starting with the common draw card in the first position (first dealt common card) and sequentially progressing through the remaining draw cards, as needed, to fill the open spots in each player's hand resulting from player discards from the initial hand. For example, a first player who discarded two cards, will receive the first common draw card (common draw card in the first position) and the second common draw card (common draw card in the second position). A second player who discarded three cards, will receive the first, second, and third common draw cards. Under this allocation of common draw cards according to the technique 400, each player who discards the same cards from the initial hand will end up with the same resulting hand because the same common draw cards will be allocated to fill the spots for the discarded cards.

As part of the technique 400, a player who is playing (either physically or virtually) at a table is selected (402), and a first sequential discard for the player is selected (404). For example, referring to the example in FIGS. 2A-B, the Player 1 is selected and the first sequential discard for player 1 (card C2) is selected. A first sequential draw card (draw card in the first position) is selected from the common draw cards (406) and is used to replace the first sequential discard (408). For example, continuing to refer to the example from FIGS. 2A-B, the first sequential draw card D1 is selected and is used to replace Player 1's first discard (C2). A determination is made as to whether there are any more discards that need to be replaced with common draw cards (410). If there are more discards, then the next sequential discard for the player is selected (412), a next sequential draw card is selected (414), and the next sequential draw card is used to replace the next sequential discard (416). For example, continuing to refer to the example from FIGS. 2A-B, the next sequential discard for Player 1 is card C4 is replaced by the next sequential common draw card is D2 (second draw card). The steps 410-416 repeat until all discards from the selected player's initial hand have been replaced with common draw cards, with the replacement progressing sequentially from the first common draw card to the last (fifth) common draw card. Once all of the discards have been replaced, a check is done as to whether there are more players physically and/or virtually playing at the table who have not yet had their discards replaced with common draw cards (418). If there are more players, then the steps 402-416 are repeated for each player. For example, referring again to the example from FIGS. 2A-B, after replacing the discards for Player 1, the discards for Player 2, Player N, as well as other players between them can be replaced according to the steps 402-416. Once each of the discards for each of the players at a table have been processed using common draw cards, the final resulting hands for the players can be returned (420) and used to determine gaming outcomes, for example, at step 316.

Referring to FIG. 4B, the example technique 450 is an alternate technique for replacing discards in each player's hand with common draw cards in a way that can provide variation in the resulting player hands. As with the example technique 400, the common draw cards are sequentially slotted into the open slots in each player's hand as a result of discards, but with the technique 450 the starting position for the sequential slotting varies among the players instead of always starting with the first draw card (as in the technique 400). For example, a first player can be assigned a starting position of the second draw card—meaning that the second common draw card (instead of the first common draw card, as with the technique 400) is selected to replace the first discard for the first player and then the draw card selection sequentially proceeds from there for additional discards (e.g., third common draw card selected to replace the second discard, etc.). However, a second example player may be assigned a starting position of the fourth draw card—meaning that the fourth common draw card (instead of the first common draw card (technique 400) or the second common draw card (first example player)) is selected to replace the first discard for the second player and then the draw card selection sequentially proceeds from there for additional discards. Since the first player and the second player in this example have different starting positions, they will end up with different resulting hands (except if they both discard all five cards from the initial hand) even if they discard the same cards from the initial hand.

This technique 450 for allocating common draw cards with variation in the starting position from which the common draw cards are sequentially allocated can provide a variety of advantages. For example, the technique 450 can introduce variation in the resulting hands and in the gaming outcomes for the players at a table even though they are using the same initial hand and the same common draw cards. In another example, the technique 450 can create variation without using a random number generator or pseudo-random number generator by assigning a starting common draw card position to players using information associated with players, such as an identifier for the player and/or equipment the player is using (e.g., player identifier, equipment identifier, MAC address), a position selected by a player (e.g., player prompted to select starting common draw card position), and/or other information (e.g., time-stamp when player gaming sessions started). In another example, the technique 450 can be implemented in a way that it creates a predictable and reliable gaming outcomes for players by assigning players a starting position that is then used to replace discards for each hand at a table for the player during a gaming session at a table. By sequentially progressing through the common draw cards to replace the discards and by identifying to the player his/her assigned starting positions (as opposed to selecting the common draw cards in a non-sequential manner or changing the assigned starting position from hand-to-hand without direct player input), players can understand the flow of the game, how the common draw cards are being selected to replace the discards, and can have more confidence in the fairness of the gaming system. Other advantages are also possible.

Figure 5A:
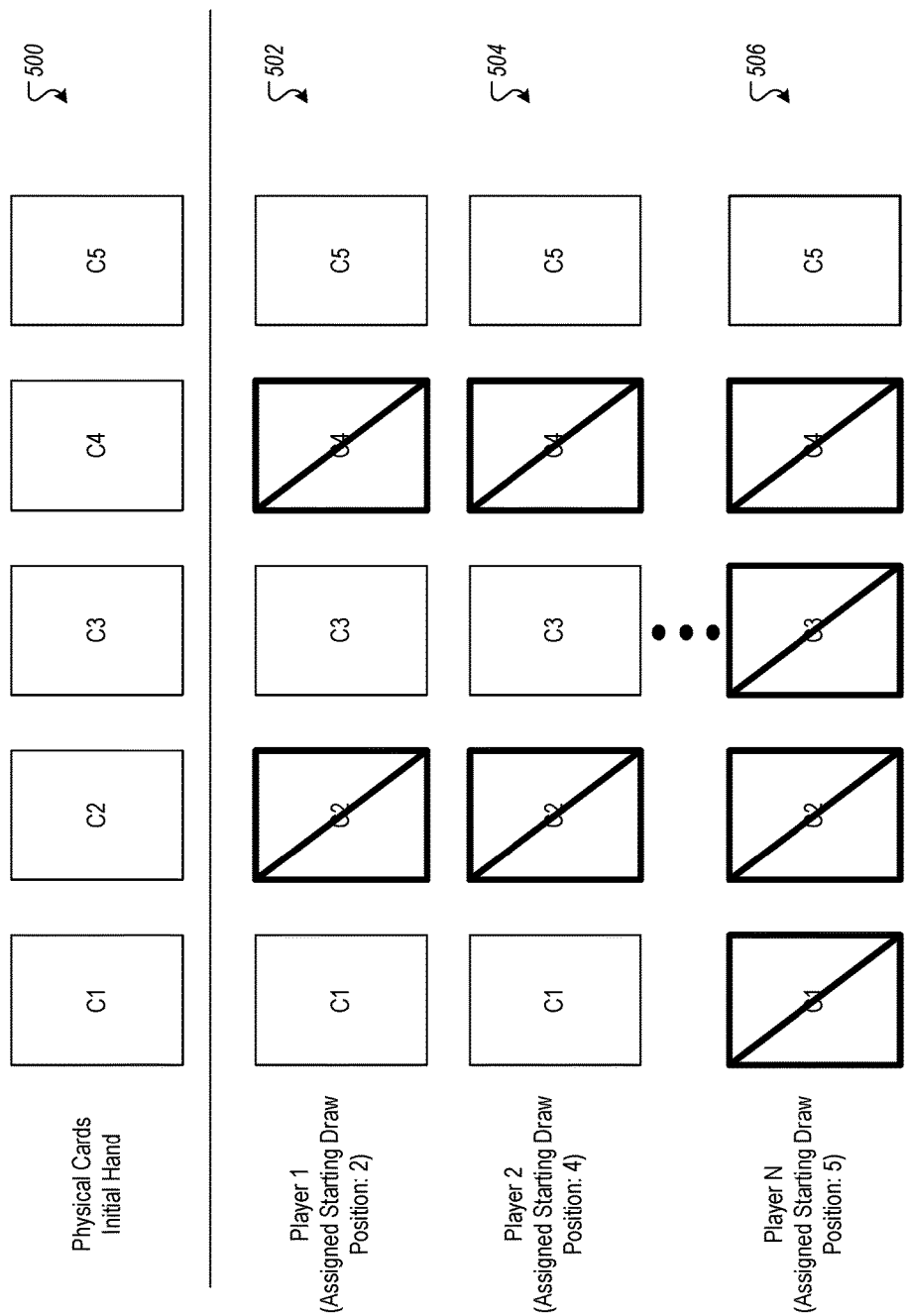
FIGS. 5A-B depict example game play using common cards with an example card-based electronic five-card draw poker gaming system.
Figure 5B:
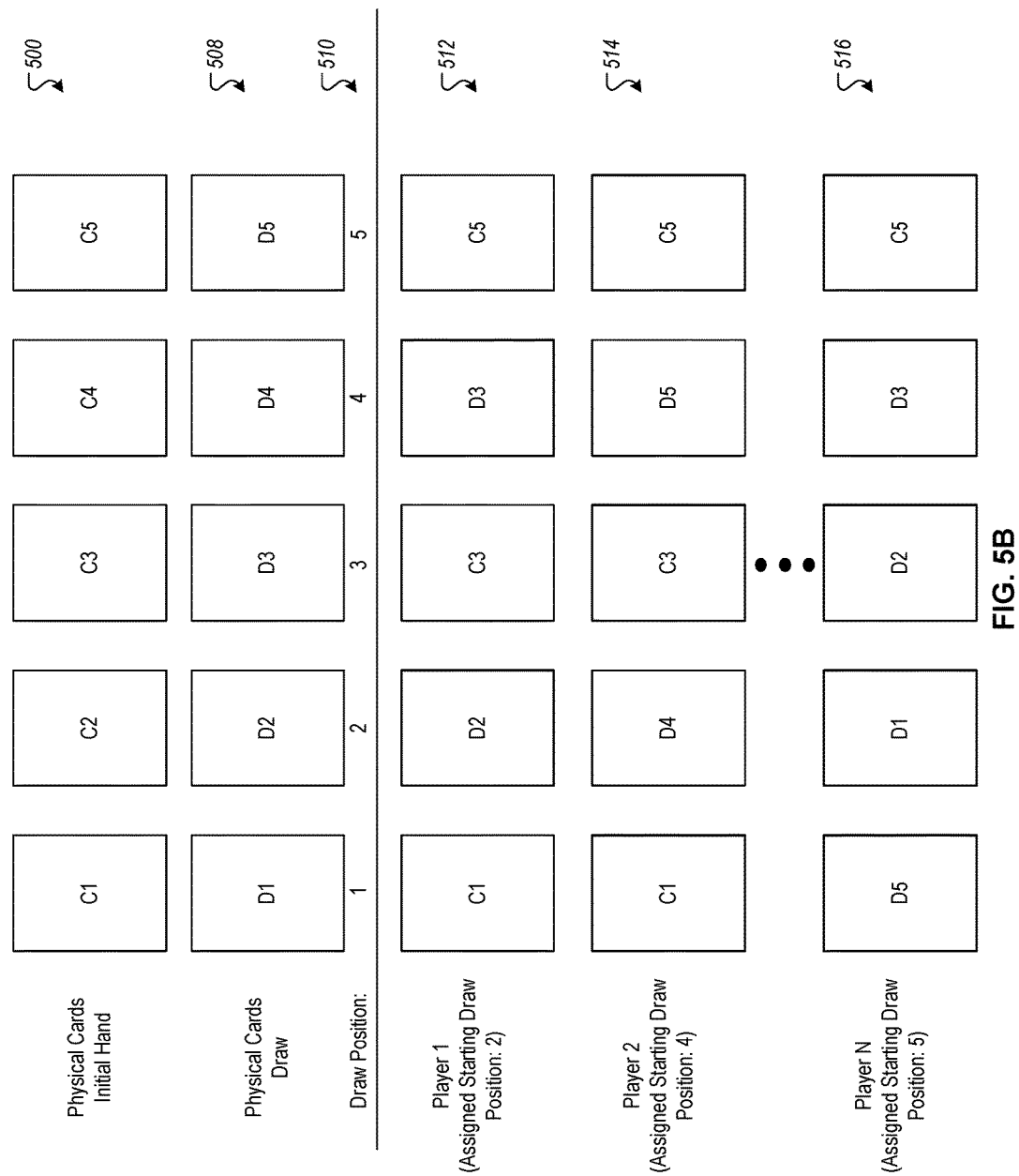

The steps of technique 450 are described below with regard to an illustrative example of this technique as depicted in FIGS. 5A-B, which depict example game play using common cards with an example card-based electronic five-card draw poker gaming system, such as the example system 100. FIGS. 5A-B are similar to FIGS. 2A-B, but the replacement of the example common draw cards in FIGS. 5A-B are determined using the technique 450, as opposed to the technique 400 used in the example depicted in FIGS. 2A-B.

A player is selected (452) and a starting draw position for the player is identified (454). The starting draw position can be determined using any of a variety of appropriate techniques, such as the example techniques described below with regard to FIGS. 6A-E. The starting draw position can be assigned to a player when he/she initiates his/her gaming session on a physical or virtual table and then can be used throughout the player's gaming session. Data identifying the starting draw positions assigned to players can be stored and retrieved for processing discards for each hand. Players may request the starting draw position be reselected during the player's gaming session, through features on a user interface for each player (e.g., selecting a feature in the user interface to reassign the starting draw position for the player). Referring to the example in FIGS. 5A-B, the example Player 1 has an assigned starting draw position of 2 (second draw card), the example Player 2 has an assigned starting draw position of 4 (fourth draw card), and the example Player N has an assigned starting draw position of 5 (fifth draw card). Although not depicted in this example, multiple players on a table can have the same starting draw position. The starting draw positions can be determined and assigned to the players when they join the table (e.g., initiates a new gaming session) according to the techniques described in FIGS. 6A-E, and then used to replace discards for the players, as described with regard to the technique 450 and in the example in FIGS. 5A-B.

The first sequential discard for the player can be selected (456), the first sequential draw card at the starting draw position can be selected (458), and the first sequential discard is replaced with the first selected sequential draw card (460). Referring to the example depicted in FIG. 5A, the initial hand 500 includes cards C1-C5, which is provided to each of the Players 1-N. In this example, the Player 1 discards cards C2 and C4 from his/her hand 502, and Player 2 performs the same discard of cards C2 and C4 from his/her hand 504. Player N discards cards C1-C4 from his/her hand 506. Referring to the example depicted in FIG. 5B, the common draw cards 508 includes cards D1-D5 which are identified as having draw positions 510 (e.g., draw card D1 has draw position 1, D2 has draw position 2, etc.). For Player 1, the first sequential discard selected is C2 and the first sequential draw card selected using Player 1's assigned starting draw position 2 is draw card D2. The first discard C2 is replaced with the selected draw card D2.

The player's hand is checked to determine whether there are any more discards for the player (462). If there are more discards, then the next sequential discard for the player is selected (464), the next sequential draw card based on the starting draw position for the player is selected (466), and the next sequential discard is replaced with the next selected sequential draw card (468). Continuing to refer to the example from FIGS. 5A-B, the next sequential discard for Player 1 is card C4 and the next sequential draw card using Player 1's assigned starting position is draw card D3. The card C4 is replaced with the selected draw card D3.

The steps 462-468 repeat until each of the discards in the selected player's hand have been replaced according to this process. Once all of the discards have been replaced, then a determination is made as to whether there are any other players who have hands that need to be processed (470). If there are additional players, then the steps 452-468 are repeated for each of the players until hands for all of the players at the table have been processed using the common discards. For example, continuing to refer to FIGS. 5A-B, a next player with a hand to be processed is Player 2, who made the same discards as Player 1. However, Player 2 has a different assigned starting draw position (position 4) than Player 1 (position 2). Accordingly, the draw cards that are selected to replace each of the discards C2 and C4 for Player 2 are different from those selected for Player 1. For instance, the first selected common draw card for Player 2 is D4 based on the assigned starting draw card for Player 2 being position 4, which replaces the first discard C2. The next selected common draw card for Player 2 is D5, which sequentially comes after D4 in the draw cards 508. D5 is replaces the second discard C4 for Player 2. The resulting hand 514 for Player 2—C1, D4, C3, D5, C5—is different from the resulting hand 512 for Player 1—C1, D2, C3, D3, C5—based on the assigned starting position for Player 1 and Player 2 being different from each other.

Continuing with the example depicted in FIG. 5B, applying the steps 452-468 to Player N's discards C1-C4 using Player N's assigned starting draw position 5 causes the D5 to be selected to replace the first discard C1. Since D5 is in the last draw position, the next sequential draw card selected can be the draw card in the first position (D1), which can be used to replace the second discard C2. The next sequential draw cards D2 and D3 can then be selected to replace the next sequential discards C3 and C4, respectively. The resulting hand 516 for Player N ends up being D5, D1, D2, D3, and C5. Other techniques for determining the next sequential draw card can be used, such as moving backward along the draw positions until the first draw position is reached (e.g., selecting draw card D4 after D5 has been selected) instead of looping back to the first position.

Once the discards in each of the players' hands have been processed, the final hands can be returned (472), such as returning the resulting hands 512, 514, and 516 for Player 1, 2, and N, respectively. The returned cards can be used, for example, to determine gaming outcomes, for example, at step 316.

FIGS. 6A-E are flowcharts of example techniques 600, 620, 640, 660, and 680 for assigning starting draw positions to players. The example techniques 600, 620, 640, 660, and 680 can be performed by any of a variety of appropriate computing equipment and/or systems, such as the table computer system 126, the computing equipment 104-118 and 136-138, and the computer system 128. The techniques 600, 620, 640, 660, and 680 can be performed, for example, as part of step 302 in the technique 300 as described above with regard to FIG. 3, and/or as part of step 454 in the technique 450, as described above with regard to FIG. 4B.

Figure 6A:
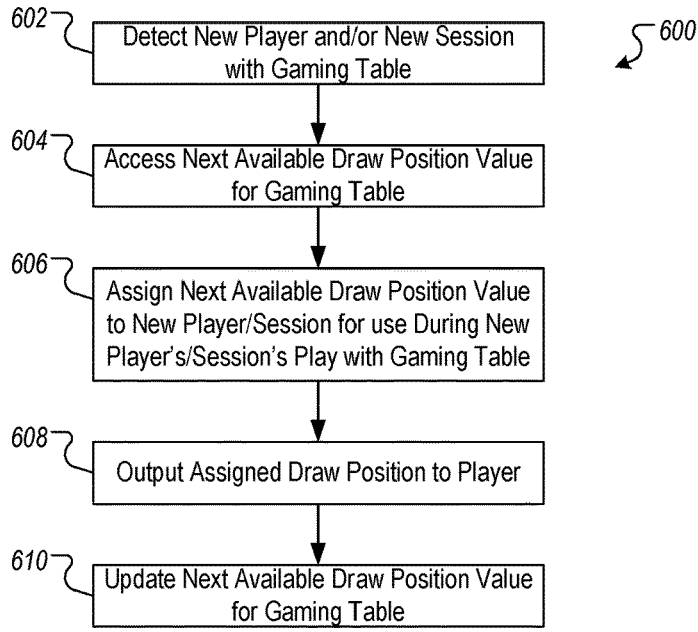
FIGS. 6A-E are flowcharts of example techniques for assigning starting draw positions to players.

Referring to FIG. 6A, the example technique 600 assigns starting draw positions to players by repeatedly cycling through the starting positions as players initiate a gaming session on a physical or virtual table. For example, a first player who joins a table can be assigned the first draw position, a next player who joins the table can be assigned the next draw position (second draw position), and then a next player who joins the table can be assigned the next draw position (third draw position). After the last/fifth draw position is reached, the process can cycle back to the first draw position for a next player who joins the table. This technique 600 can be performed repeatedly for each table as players join the gaming action. The technique 600 can provide any of a variety of advantages. For example, the technique 600 can provide a more even distribution of players at a table across the different starting draw positions.

A new player and/or new gaming session on a gaming table can be detected (602). For example, a player can join the gaming table 102 by either physically using one of the electronic touchscreens 104-118 at the table 102 or by using a remote computing equipment 136-138 to remotely connect to the action on the table 102. In another example, a player who is already playing on a gaming table may manually initiate step 602 and the technique 600 by selection an option to reassign the starting draw position for the player.

A next available draw position value for the gaming table can be accessed (604) and can be assigned to the new player and/or session for use during the player's play on the gaming table (606). For example, the system 100 can store a next available draw position value that is incremented and then, once the end/fifth draw position is assigned, cycled back through to the first draw position. Alternatively, this value can be decremented and then cycled back to the fifth draw position once the first draw position is used/exhausted. The assigned draw position for the user can be output to the player, such as on the electronic touchscreens 104-118, so that the player is aware of the draw position that will be used for the player's gaming action. This value can be referenced when a new player/session is being initiated and can be assigned to the player, and then can be updated (e.g., incremented, decremented) for use with the next player/session that joins the table (610).

Figure 6B:
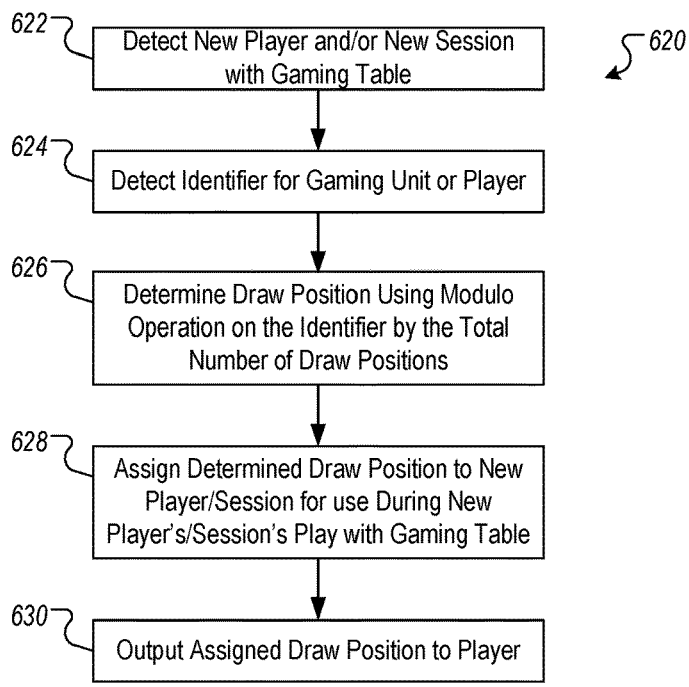

Referring to FIG. 6B, the example technique 620 assigns starting draw positions to players using identifiers for the gaming unit and/or player. Like step 602, a new player and/or session is detected with a gaming table (622) and an identifier for the gaming unit that is going to be used and/or an identifier for the player is detected (624). For example, an identifier for the local electronic touchscreens 104-118 and/or the remote computing equipment 136-138 can be identified, such as a unique identifier used by the system 100 to identify the computing equipment 104-118, 136-138, MAC addresses for this equipment, and/or other equipment identifiers. Additionally and/or alternatively, an identifier for the player can be detected, such as an ID on a player gaming card/account.

The starting draw position for the player can be determined by applying a modulo operation to the detected identifier and the total number of draw positions (5 draw positions) (626). A modulo operation is an operation that involves dividing a number by a denominator (5) and receiving the remainder value. For example, if the identifier for the player is 123, performing the modulo operation on this identifier with the denominator 5 returns the value 3 (e.g., 123%5=3). Performing the modulo operation returns values 0-4 regardless of the numerator that is being used. These values (0-4) can be used to assign the draw position for the new player/session (628). In some instances, these values (0-4) from the modulo operation can serve as the draw position itself. In some instances, these values (0-4) can be modified, such as being incremented by one, to generate the draw position. Once assigned, the draw position can be output to the player (630), similar to the step 610.

Figure 6C:
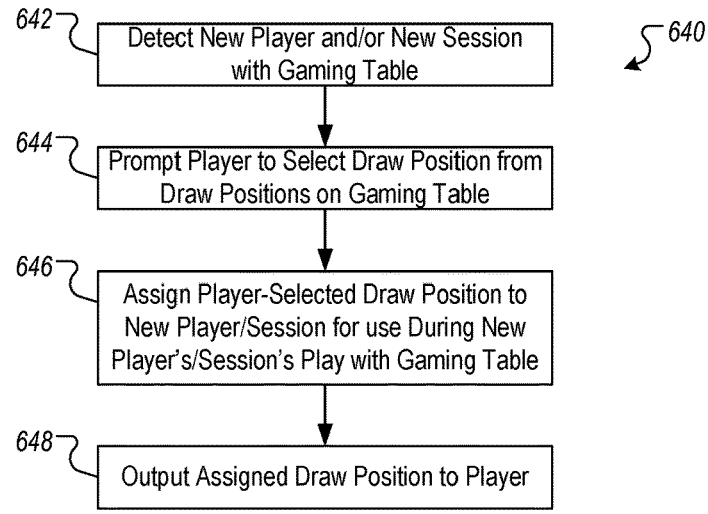

Referring to FIG. 6C, the example technique 640 assigns starting draw positions to players by permitting the players to manually select their starting positions. Like step 602, a new player and/or session is detected with a gaming table (642) and the player is provided with a prompt to select from among draw positions on the gaming table (644). For example, when a player joins a gaming table and/or initiates a new gaming session, the user interface that the player is using can provide the player with selectable options (e.g., five buttons with values 1-5 that the player can select) for the starting draw position that will be used for the player's gaming session on the table. The player-selected draw position can be assigned to the player (646) and can be output on the equipment to confirm the selection to the user (648).

Figure 6D:
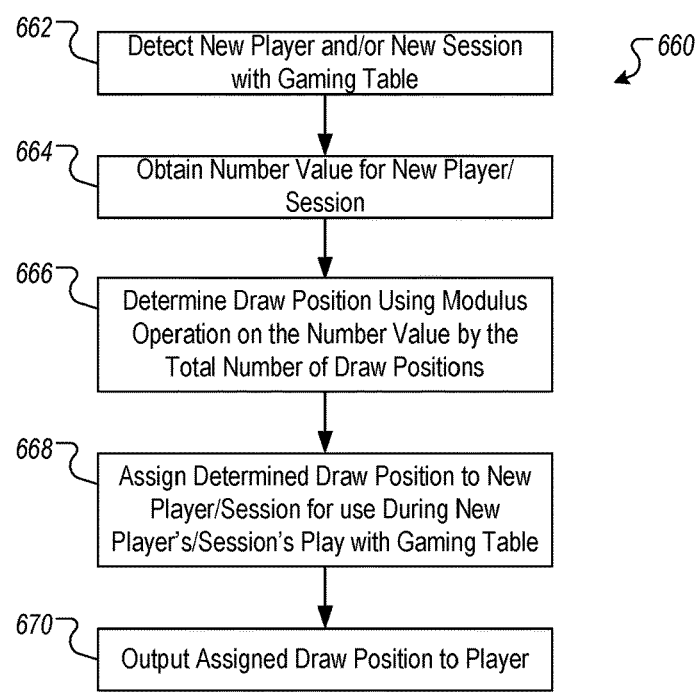

Referring to FIG. 6D, similar to the technique 620, the example technique 660 obtains a value associated with the new player and/or new session, and uses that value to determine the starting draw position to assign to the player. Like steps 622 and 624, the new player and/or new session on the gaming table can be detected (662) and a number value for the new player and/or session can be obtained (664). The number value can be an identifier, like with the technique 620, and/or other values, such as a timestamp when the player initiated his/her gaming session, combinations of values (e.g., multiplication, addition, division, or other operation combining an identifier for the computing equipment and other values), and/or other values. Like steps 626 and 628, the draw position can be determined by using the modulus operation and the number value (666) and can be assigned to the user (668). As with the step 630, the assigned draw position can be output to the user (670).

Figure 6E:
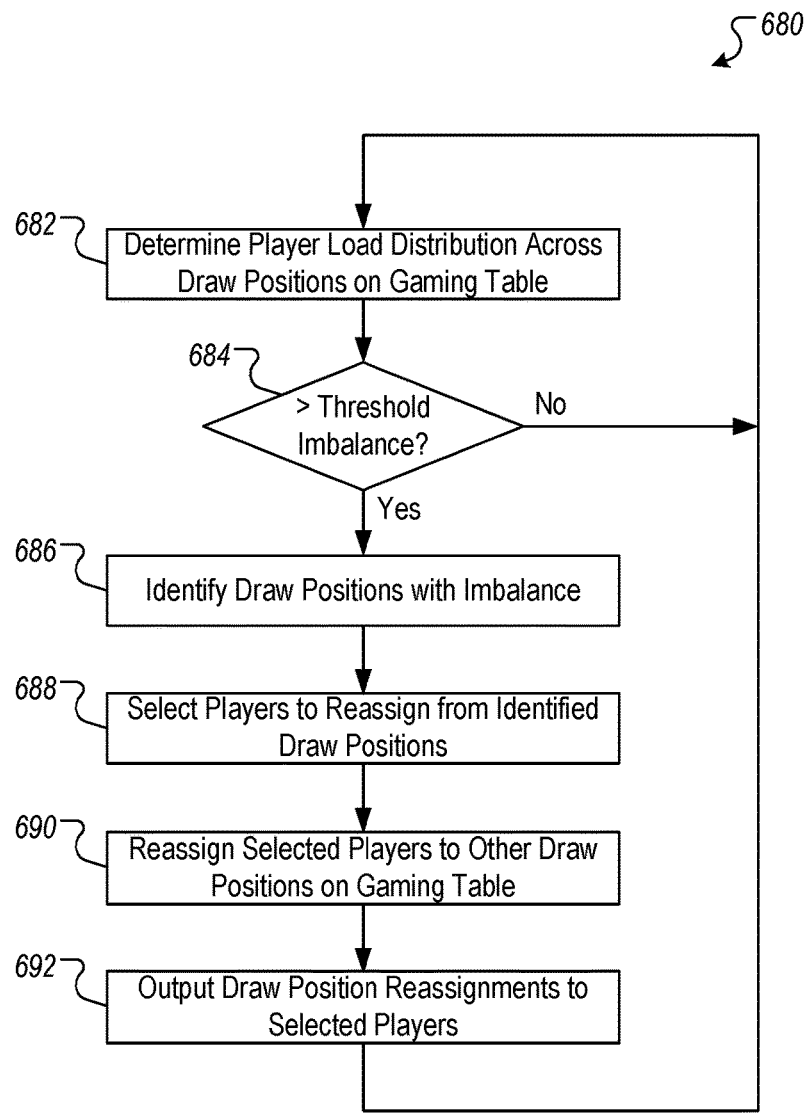

Referring to FIG. 6E, the technique 680 performs load balancing on the distribution of players across the starting draw positions on a gaming table. The technique 680 can be performed periodically (e.g., every 15 minutes, 30 minutes, 45 minutes, 1 hour, 2 hours) and can be used to ensure that no single starting draw position has greater than a threshold amount (e.g., percentage, raw number) of the players relative to the other starting draw positions.

Player load distributions across the draw positions on the gaming table can be determined (682). For example, the number of current players that are assigned to each draw position can be identified. A determination can be made as to whether there is greater than a threshold imbalance in this distribution (684). Such a threshold imbalance can be indicated by one of the draw positions exceeding a threshold amount of assigned players. For example, with an even distribution each of the five draw positions will have 20% of the players. However, if one or more of the draw positions (e.g., draw position 2) deviates significantly above this even distribution value (e.g., draw position has greater than 40%, 50%, 60%, 70% of the distribution), the resulting imbalance can potentially increase the liability exposure for the house and it can be desirable to rebalance the assignment of players across the five draw positions. Additionally and/or alternatively, the rebalancing can be performed based on an average amount that players are betting so that there is a more even distribution in the aggregate amount that is being wagered for each of the draw positions. For example, one player betting an average of $500/hand may be assigned to a first draw position and each of the other draw positions may be assigned ten players betting $5/hand to provide a more even distribution of the amount wagered per draw position.

When it is determined that there is greater than a threshold imbalance, the specific draw positions that have the imbalance can be identified (686), a portion of the players from those draw positions be selected for reassignment (688), and the selected players can be assigned to other draw positions (690). For example, if the second draw position has greater than a threshold percentage of the assigned players, then the second draw position can be identified as having imbalance and a portion of the players assigned to the second draw position can be selected for reassignment. Any of a variety of appropriate processes for selecting players for reassignment can be used, for example, players who most recently joined the table can be selected in reverse chronological order until a sufficient number of players to remedy the imbalance have been selected for reassignment. Other techniques for selecting players can also be used. The reassignment of these selected players can be performed according to one or more of the techniques 600, 620, 640, and 660. The new draw positions for the reassigned players can be output on the computing equipment for each of the reassigned plyers (692).

In addition to the features described above, game play can continue with one or more additional rounds of players making discard selections and common cards being dealt to replace the discard selections. For example, players can have two rounds of discards—involving two sets of common cards being dealt—before the final resulting hands are generated and gaming outcomes are determined. Payouts for such multi-round discards and common draw card replacements may, in some instances, be decreased over the payouts for a single round of discards and common draw cards. Such single vs. multi-round discard/common draw cards in game play may be static and fixed at the outset on a table (e.g., a first table provides only one round of discards whereas a second table provides only two round discards), or it may be dynamically selected by the players at the table. For example, players may be given the option of whether to enter additional rounds of discards and common draw cards in exchange for the payouts on resulting hands decreasing. Such options can be presented before each hand commences, and/or after the first round of discards has concluded.

Figure 7:
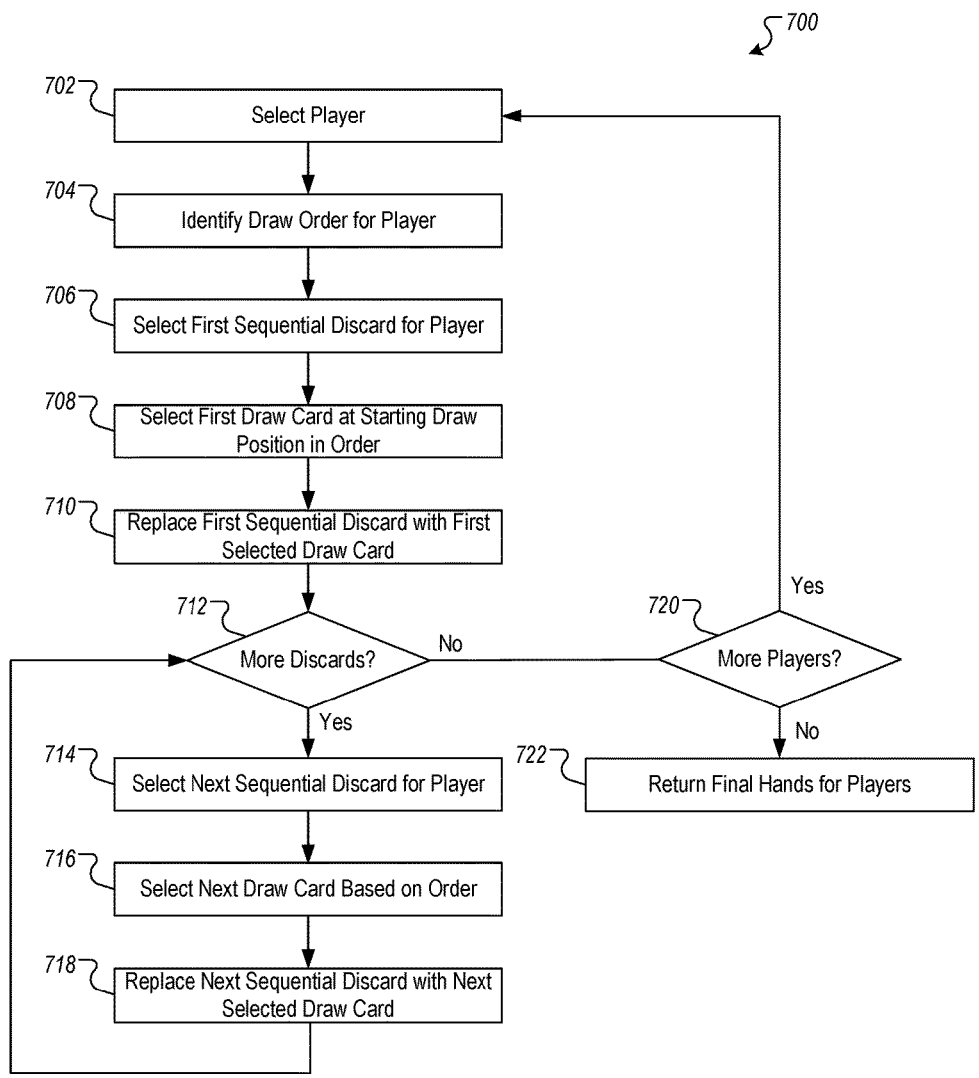
FIG. 7 is a flowchart of an example technique for replacing discards in player hands from common draw cards to generate a final resulting hand for each player.

FIG. 7 is a flowchart of an example technique 700 for replacing discards in player hands from common draw cards to generate a final resulting hand for each player. The example technique 700 can be performed by any of a variety of appropriate computing equipment and/or systems, such as the table computer system 126, the computing equipment 104-118 and 136-138, and the computer system 128. The technique 700 can be performed, for example, as part of step 314 in the technique 300, as described above with regard to FIG. 3.

The example technique 700 is an alternate technique for replacing discards in each player's hand with common draw cards in a way that can provide variation in the resulting player hands. As with the example techniques 400 and 450, the common draw cards are slotted into the open slots in each player's hand as a result of discards, but with the technique 700 the slotting varies among the players according to a draw order that is assigned to each player. This is different from the example technique 450 in which only the starting position for the draw card varies across the players. With the technique 700, the order with which each of the draw cards are selected to replace the discards can vary. For example, a first player can have an assigned draw order of that is different from the assigned draw order of a second player at each position—meaning that a different draw card is selected for each player for each discard. The technique 700 can create greater variation in the resulting hands than the technique 450. For example, the technique 450 can provide five variations in the resulting hands across the players by assigning one of five different starting positions to each player. In contrast, the technique 450 can provide 120 variations (5×4×3×2×1) in the resulting hands across the players by assigning one of the 120 different draw orders that are possible across a set of five draw cards. Accordingly, the technique 700 can provide the same or, in some instances, greater advantages over the techniques 400 and 450 by injecting greater variation in outcomes across the players. Additionally, the technique 700 can provide other advantages, such as identifying to the player his/her assigned draw order, players can understand the flow of the game, how the common draw cards are being selected to replace the discards, and can have more confidence in the fairness of the gaming system. Other advantages are also possible.

Figure 8A:
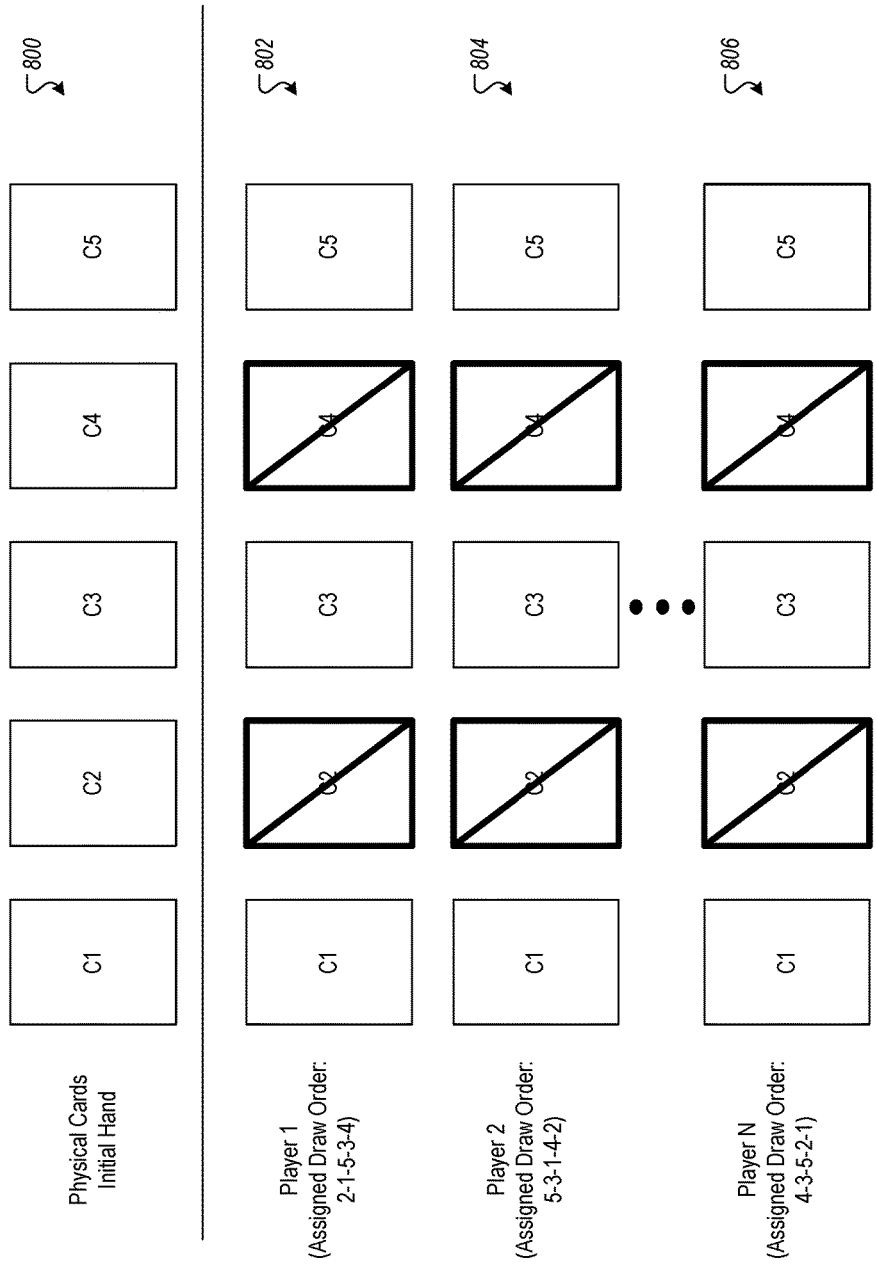
FIGS. 8A-B depict example game play using common cards with an example card-based electronic five-card draw poker gaming system.
Figure 8B:
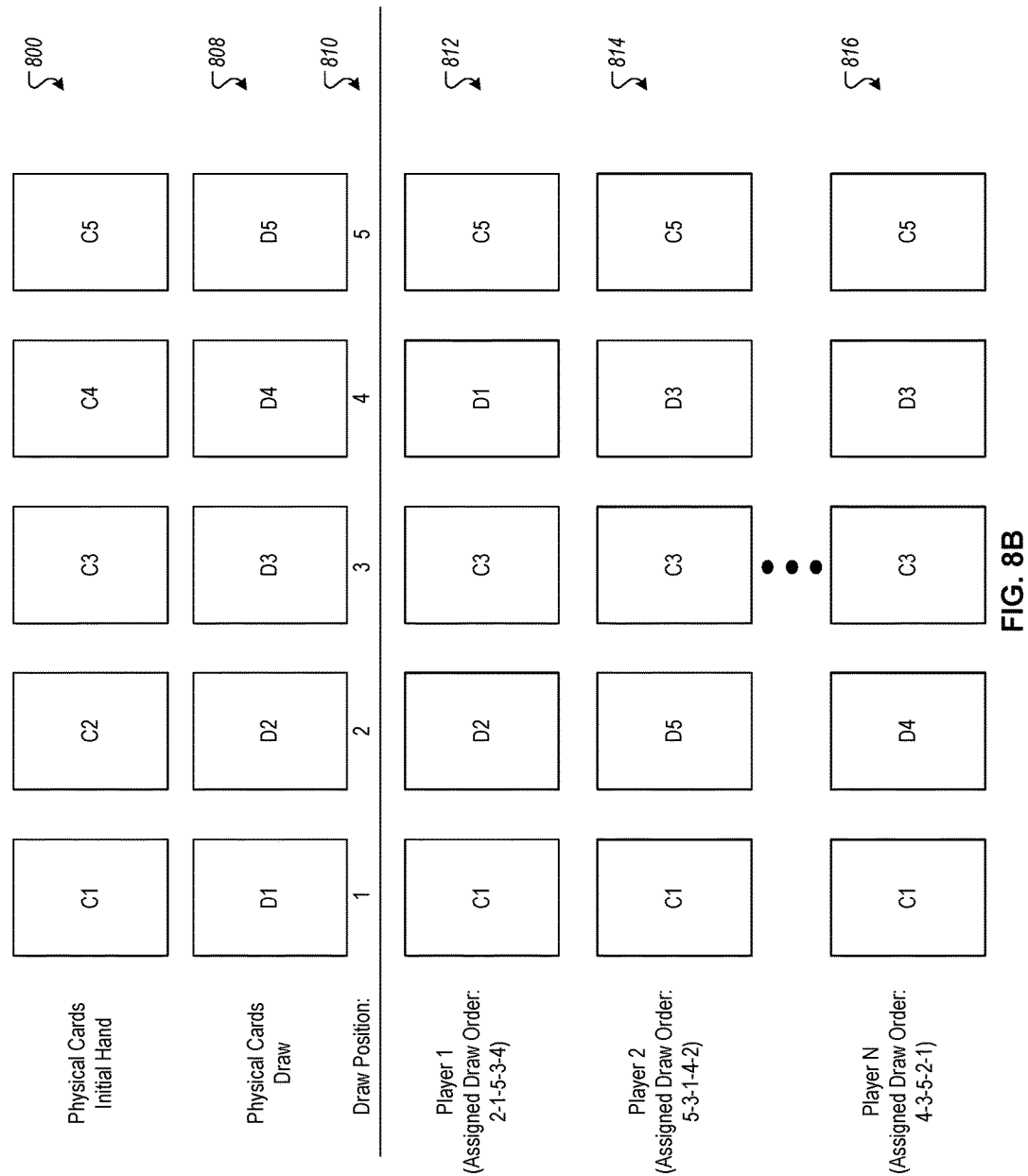

The steps of technique 700 are described below with regard to an illustrative example of this technique as depicted in FIGS. 8A-B, which depict example game play using common cards with an example card-based electronic five-card draw poker gaming system, such as the example system 100. FIGS. 8A-B are similar to FIGS. 2A-B and 5A-B, but the replacement of the example common draw cards in FIGS. 8A-B are determined using the technique 700, as opposed to the techniques 400 or 450 used in the example depicted in FIGS. 2A-B and 5A-B.

A player is selected (702) and a starting draw order for the player is identified (704). The draw order for the player can be a non-sequential sequence of draw positions and can be determined using any of a variety of appropriate techniques, such as the example techniques described above with regard to FIGS. 6A-D. For example, even though each of the example techniques in FIGS. 6A-D select only a starting draw position for a player, each of these techniques can be repeatedly performed (e.g., performed 5 times) to select a draw order for the player. Additionally, these techniques in FIGS. 6A-D can be combined to select the draw order for a player, with different techniques being used to select different portions of the draw order. Data identifying the order assigned to players can be stored and retrieved for processing discards for each hand. Players may request the draw order be reselected during the player's gaming session, through features on a user interface for each player (e.g., selecting a feature in the user interface to reassign the draw order for the player). Referring to the example in FIGS. 8A-B, the example Player 1 has an assigned a draw order of 2-1-5-3-4 (second draw card→first draw card→fifth draw card→third draw card→fourth draw card), the example Player 2 has an assigned a draw order of 5-3-1-4-2 (fifth draw card→third draw card→first draw card→fourth draw card→second draw card), and the example Player N has an assigned starting draw position of 4-3-5-2-1 (fourth draw card→third draw card→fifth draw card→second draw card4 first draw card). Although not depicted in this example, multiple players on a table may have the same draw order, although there are more possible variation (120 variations) in the draw order than variations in the starting position (5 variations, as discussed above with regard to the technique 450). The draw order can be determined and assigned to the players when they join the table (e.g., initiates a new gaming session) according to the techniques described in FIGS. 6A-E (as modified to be performed multiple times to select the draw order), and then used to replace discards for the players, as described with regard to the technique 700 and in the example in FIGS. 8A-B.

The first sequential discard for the player can be selected (706), the first draw card at the starting position in the draw order can be selected (708), and the first sequential discard is replaced with the first selected draw card (710). Referring to the example depicted in FIG. 8A, the initial hand 800 includes cards C1-C5, which is provided to each of the Players 1-N. In this example, each of the Players 1, 2, and N discard cards C2 and C4 from his/her hands 802, 804, and 806. Referring to the example depicted in FIG. 8B, the common draw cards 808 includes cards D1-D5 which are identified as having draw positions 810 (e.g., draw card D1 has draw position 1, D2 has draw position 2, etc.). For Player 1, the first sequential discard selected is C2 and the first draw card selected using Player 1's assigned draw order is draw card D2. The first discard C2 is replaced with the selected draw card D2.

The player's hand is checked to determine whether there are any more discards for the player (712). If there are more discards, then the next sequential discard for the player is selected (714), the next draw card based on the draw order for the player is selected (716), and the next sequential discard is replaced with the next selected draw card (718). Continuing to refer to the example from FIGS. 8A-B, the next sequential discard for Player 1 is card C4 and the next draw card using Player 1's assigned draw order is draw card D1. The card C4 is replaced with the selected draw card D1.

The steps 712-718 repeat until each of the discards in the selected player's hand have been replaced according to this process. Once all of the discards have been replaced, then a determination is made as to whether there are any other players who have hands that need to be processed (720). If there are additional players, then the steps 702-720 are repeated for each of the players until hands for all of the players at the table have been processed using the common discards. For example, continuing to refer to FIGS. 8A-B, a next player with a hand to be processed is Player 2, who made the same discards as Player 1. However, Player 2 has a different assigned draw order than Player 1. Accordingly, the draw cards that are selected to replace each of the discards C2 and C4 for Player 2 are different from those selected for Player 1. For instance, the first selected common draw card for Player 2 is D5 based on the assigned draw order for Player 2, which replaces the first discard C2. The next selected common draw card for Player 2 is D3 based on the assigned draw order for Player 2. D3 is replaces the second discard C4 for Player 2. The resulting hand 814 for Player 2—C1, D5, C3, D3, C5—is different from the resulting hand 812 for Player 1—C1, D2, C3, D1, C5—based on the assigned draw orders for Player 1 and Player 2 being different from each other.

Continuing with the example depicted in FIG. 8B, applying the steps 702-720 to Player N's discards C2 and C4, which are the same as those for Players 1-2, Player N's assigned draw order causes D4 to be selected to replace the first discard C2 and D3 to be selected to replace the second discard C4. The resulting hand 816 for Player N ends up being C1, D4, C3, D3, and C5, which again is different from both the hands for Players 1 and 2, even though they each selected the same discards from the same initial hand and from the same common draw cards.

Once the discards in each of the players' hands have been processed, the final hands can be returned (722), such as returning the resulting hands 812, 814, and 816 for Player 1, 2, and N, respectively. The returned cards can be used, for example, to determine gaming outcomes, for example, at step 316.

Figure 9:
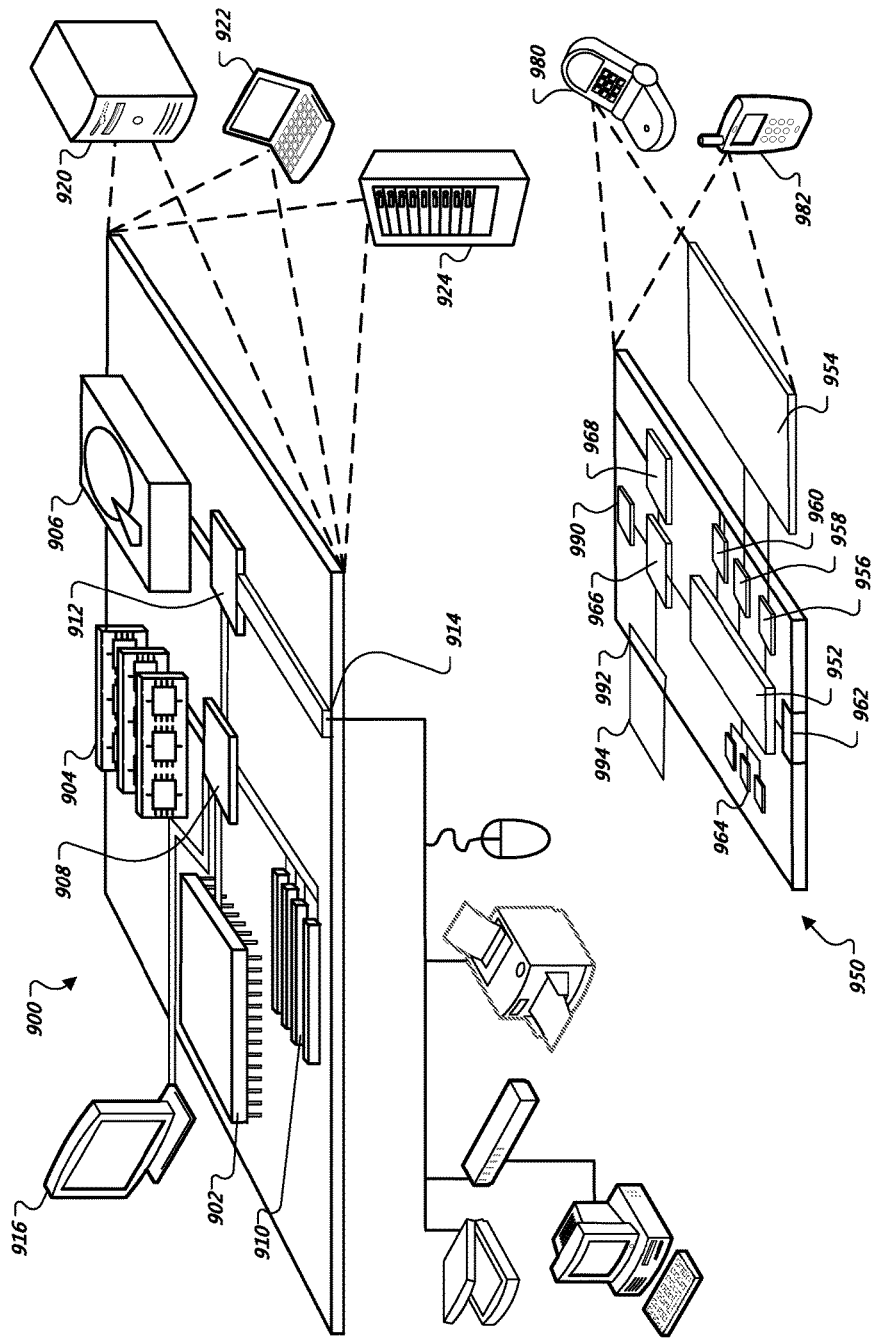
FIG. 9 is a block diagram of example computing equipment.

FIG. 9 is a block diagram of computing equipment 900, 950 that may be used to implement the systems and methods described in this document, as either a client or as a server or plurality of servers. Computing equipment 900 is intended to represent various forms of digital computers, such as laptops, desktops, workstations, personal digital assistants, servers, blade servers, mainframes, and other appropriate computers. Computing equipment 950 is intended to represent various forms of mobile computing equipment, such as personal digital assistants, cellular telephones, smartphones, and other similar computing equipment. Additionally computing equipment 900 or 950 can include Universal Serial Bus (USB) flash drives. The USB flash drives may store operating systems and other applications. The USB flash drives can include input/output components, such as a wireless transmitter or USB connector that may be inserted into a USB port of another computing equipment. The components shown here, their connections and relationships, and their functions, are meant to be exemplary only, and are not meant to limit implementations described and/or claimed in this document.

Computing equipment 900 includes a processor 902, memory 904, a storage equipment 906, a high-speed interface 908 connecting to memory 904 and high-speed expansion ports 910, and a low speed interface 912 connecting to low speed bus 914 and storage equipment 906. Each of the components 902, 904, 906, 908, 910, and 912, are interconnected using various busses, and may be mounted on a common motherboard or in other manners as appropriate. The processor 902 can process instructions for execution within the computing equipment 900, including instructions stored in the memory 904 or on the storage equipment 906 to display graphical information for a GUI on an external input/output apparatus, such as display 916 coupled to high speed interface 908. In other implementations, multiple processors and/or multiple buses may be used, as appropriate, along with multiple memories and types of memory. Also, multiple computing equipment 900 may be connected, with each equipment providing portions of the necessary operations (e.g., as a server bank, a group of blade servers, or a multi-processor system).

The memory 904 stores information within the computing equipment 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage equipment 906 is capable of providing mass storage for the computing equipment 900. In one implementation, the storage equipment 906 may be or contain a computer-readable medium, such as a floppy disk, a hard disk, an optical disk, or a tape, a flash memory or other similar solid state memory, or an array of storage equipment, including equipment in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage equipment 906, or memory on processor 902.

The high speed controller 908 manages bandwidth-intensive operations for the computing equipment 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage equipment 906 and low-speed expansion port 914. The low-speed expansion port, which may include various communication ports (e.g., USB, Bluetooth, Ethernet, wireless Ethernet) may be coupled to one or more input/output apparatuses, such as a keyboard, a pointer, a scanner, or a networking equipment such as a switch or router, e.g., through a network adapter.

The computing equipment 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing equipment 900 may be combined with other components in a mobile computing equipment (not shown), such as equipment 950. Each of such equipment may contain one or more of computing equipment 900, 950, and an entire system may be made up of multiple computing equipment 900, 950 communicating with each other.

Computing equipment 950 includes a processor 952, memory 964, an input/output apparatus such as a display 954, a communication interface 966, and a transceiver 968, among other components. The equipment 950 may also be provided with a storage equipment, such as a microdrive or other equipment, to provide additional storage. Each of the components 950, 952, 964, 954, 966, and 968, are interconnected using various buses, and several of the components may be mounted on a common motherboard or in other manners as appropriate.

The processor 952 can execute instructions within the computing equipment 950, including instructions stored in the memory 964. The processor may be implemented as a chipset of chips that include separate and multiple analog and digital processors. Additionally, the processor may be implemented using any of a number of architectures. For example, the processor 910 may be a CISC (Complex Instruction Set Computers) processor, a RISC (Reduced Instruction Set Computer) processor, or a MISC (Minimal Instruction Set Computer) processor. The processor may provide, for example, for coordination of the other components of the equipment 950, such as control of user interfaces, applications run by equipment 950, and wireless communication by equipment 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of equipment 950 with other equipment. External interface 962 may provide, for example, for wired communication in some implementations, or for wireless communication in other implementations, and multiple interfaces may also be used.

The memory 964 stores information within the computing equipment 950. The memory 964 can be implemented as one or more of a computer-readable medium or media, a volatile memory unit or units, or a non-volatile memory unit or units. Expansion memory 994 may also be provided and connected to equipment 950 through expansion interface 992, which may include, for example, a SIMM (Single In Line Memory Module) card interface. Such expansion memory 994 may provide extra storage space for equipment 950, or may also store applications or other information for equipment 950. Specifically, expansion memory 994 may include instructions to carry out or supplement the processes described above, and may include secure information also. Thus, for example, expansion memory 994 may be provide as a security module for equipment 950, and may be programmed with instructions that permit secure use of equipment 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 994, or memory on processor 952 that may be received, for example, over transceiver 968 or external interface 962.

Equipment 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 990 may provide additional navigation- and location-related wireless data to equipment 950, which may be used as appropriate by applications running on equipment 950.

Equipment 950 may also communicate audibly using audio codec 960, which may receive spoken information from a user and convert it to usable digital information. Audio codec 960 may likewise generate audible sound for a user, such as through a speaker, e.g., in a handset of equipment 950. Such sound may include sound from voice telephone calls, may include recorded sound (e.g., voice messages, music files, etc.) and may also include sound generated by applications operating on equipment 950.

The computing equipment 950 may be implemented in a number of different forms, as shown in the figure. For example, it may be implemented as a cellular telephone 980. It may also be implemented as part of a smartphone 982, personal digital assistant, or other similar mobile computing equipment.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input apparatus, and at least one output apparatus.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or equipment (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display equipment (e.g., a CRT (cathode ray tube) or LCD (liquid crystal display) monitor) for displaying information to the user and a keyboard and a pointing equipment (e.g., a mouse or a trackball) by which the user can provide input to the computer. Other kinds of equipment can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A electronic five-card draw poker gaming system using common physical cards, the system comprising:
   a plurality of physical playing cards;
   a scanner that is configured to identify each of the plurality of physical playing cards as they are dealt by a dealer;
   a gaming table where the plurality of physical playing cards are dealt and identified by the scanner;
   a plurality of player computing equipment with graphical displays that are programmed to provide individualized five-card draw poker gaming interfaces for a plurality of players, wherein at least a portion of the plurality of player computing equipment is remote from the gaming table yet within a same facility as the gaming table, the individualized five-card draw poker gaming interfaces each being programmed to:
      output a virtual five-card draw poker hand for a corresponding player, and
      receive user input to perform one or more discard actions with regard to the virtual five-card draw poker hand;
   a five-card draw poker gaming computing system that is communicably connected to the scanner and the plurality of player computing equipment, the five-card draw poker gaming computing system being programmed to:
   provide five-card porker gaming on the plurality of player computing equipment using cards dealt on the gaming table based on (i) predetermined pairings between the plurality of player computing equipment and the gaming table, (ii) user selection of the gaming table from among a plurality of gaming tables via the individualized five-card draw poker gaming interfaces on the plurality of player computing equipment, or (iii) automatic selection of the gaming table from among the plurality of gaming tables by the five-card draw poker gaming system;
      identify five of the physical playing cards that are detected by the scanner, the five of the physical playing cards being common across the plurality of players;
      assign the five of the physical playing cards as an initial five-card draw poker hand for each of the plurality of players;
      transmit the initial five-card draw poker hand to the plurality of player computing equipment;
      receive, from the plurality of player computing equipment, information identifying the discard actions performed by each of the plurality of players with regard to the initial five-card draw poker hand;
      identify next five of the physical playing cards that are detected by the scanner, the next five of the physical playing cards being common across the plurality of players;
      assign a draw order for each of the plurality of players;
      generate final five-card draw poker hands for the plurality of players based on the initial five-card draw poker hand, the discard actions performed by each of the plurality of players, and the next five of physical playing cards, wherein the assigned draw order is used to select which the next five of the physical playing cards replace discards from the initial five-card draw poker hand; and
      determine gaming outcomes for each of the plurality of players based on the final five-card draw poker hands, wherein each of the plurality of players has an individualized gaming outcome even though they receive the same initial five-card draw poker hand and the same next five of the physical playing card as draw cards based on the discard actions.

2. The system of claim 1, wherein:
   the discard actions comprise, for each of the plurality of players, discarding between zero and five cards from the initial five-card draw poker hand,
   the next five of the physical playing cards are in a card sequence, and
   generating the final five-card draw poker hands for each of the plurality of players comprises:
      replacing, to the extent at least one card has been discarded, a first discarded card from the initial five-card draw poker hand with, according to the assigned draw order, a first card from the card sequence of the next five of the physical playing card;
      replacing, to the extent that at least two cards have been discarded, a second discarded card from the initial five-card draw poker hand with, according to the assigned draw order, a second card from the card sequence of the next five of the physical playing card;
      replacing, to the extent that at least three cards have been discarded, a third discarded card from the initial five-card draw poker hand with, according to the assigned draw order, a third card from the card sequence of the next five of the physical playing card;
      replacing, to the extent that at least four cards have been discarded, a fourth discarded card from the initial five-card draw poker hand with, according to the assigned draw order, a fourth card from the card sequence of the next five of the physical playing card; and
      replacing, to the extent that all five cards from the initial five-card draw poker hand have been discarded, a fifth discarded card from the initial five-card draw poker hand with, according to the assigned draw order, fifth card from the card sequence of the next five of the physical playing card.

3. The system of claim 2, wherein the draw order comprises a starting position for sequentially selecting cards from the next five of the physical playing cards to replace the discards.

4. The system of claim 3, wherein a default starting position comprises a first position from the next five of the physical playing cards.

5. The system of claim 2, wherein the draw order comprises an ordered sequence of draw card positions for selecting cards from the next five of the physical playing cards to replace the discards.

6. The system of claim 2, wherein the draw order for each player is assigned using a unique identifier associated with each player or corresponding player computing equipment.

7. The system of claim 2, wherein the draw order for each player is assigned using one or more of: a next available draw order for the five-card draw poker gaming computing system, an identifier for a player computing equipment, an identifier for a player, and one or more user-selected values.

8. The system of claim 2, wherein the five-card draw poker gaming computing system is further programmed to rebalance the players assigned to the draw orders when at least a threshold level of imbalance is reached.

9. The system of claim 8, wherein the threshold level of imbalance is determined based on one or more of: a number of players assigned to each draw order and an aggregate average bet amount for each draw order.

10. The system of claim 1, wherein:
the discard actions comprise, for each of the plurality of players, discarding between zero and five cards from the initial five-card draw poker hand,
the next five of the physical playing cards are in a card sequence, and
generating the final five-card draw poker hands for each of the plurality of players comprises:
replacing, to the extent at least one card has been discarded, a first discarded card from the initial five-card draw poker hand with a first card from the card sequence of the next five of the physical playing card;
replacing, to the extent that at least two cards have been discarded, a second discarded card from the initial five-card draw poker hand with a second card from the card sequence of the next five of the physical playing card;
replacing, to the extent that at least three cards have been discarded, a third discarded card from the initial five-card draw poker hand with a third card from the card sequence of the next five of the physical playing card;
replacing, to the extent that at least four cards have been discarded, a fourth discarded card from the initial five-card draw poker hand with a fourth card from the card sequence of the next five of the physical playing card; and
replacing, to the extent that all five cards from the initial five-card draw poker hand have been discarded, a fifth discarded card from the initial five-card draw poker hand with a fifth card from the card sequence of the next five of the physical playing card.

11. The system of claim 1, wherein at least another portion of the plurality of player computing equipment are located at the gaming table.

12. The system of claim 1, wherein the portion of the plurality of player computing equipment are at one or more different locations within the same facility as the gaming table.

13. The system of claim 12, wherein the one or more different locations include another gaming table within the facility.

14. The system of claim 12, wherein the one or more different locations include a gaming equipment within the facility that is not positioned at a gaming table.

15. The system of claim 1, wherein at least another portion of the plurality of player computing equipment are remote from the facility where the gaming table is located.

16. The system of claim 1, wherein the gaming outcomes are determined based on (i) a physical ordering from which the plurality of physical playing cards are dealt and (ii) the discard actions from each of the plurality of players.

17. The system of claim 1, wherein the scanner includes one or more of: an RFID reader, an optical scanner, a barcode scanner, and a camera.

18. The system of claim 1, wherein the dealer is a human.

19. The system of claim 1, wherein the dealer is a robot.

20. A electronic five-card draw poker gaming apparatus using common physical cards, the gaming apparatus comprising:
a deck of physical playing cards;
a physical card scanner that is configured to identify each of the physical playing cards as they are physically dealt by a dealer;
a physical gaming table with a top surface with a first designated area for common initial cards and a second designated area for common draw cards, wherein the physical card scanner is positioned on or adjacent to the top surface;
a plurality of touchscreen gaming displays programmed to provide individualized five-card draw poker gaming interfaces for a plurality of players using the common initial cards and the common draw cards, wherein at least a portion of the plurality of touchscreen gaming displays are remote from the physical gaming table yet within a same facility as the physical gaming table;
five-card draw poker gaming circuitry (i) to provide five-card porker gaming on the plurality of touchscreen gaming displays using cards dealt on the physical gaming table based on (a) predetermined pairings between the plurality of touchscreen gaming displays and the physical gaming table, (b) user selection of the physical gaming table from among a plurality of physical gaming tables via the individualized five-card draw poker gaming interfaces on the plurality of touchscreen gaming displays, or (c) automatic selection of the physical gaming table from among the plurality of physical gaming tables by the five-card draw poker gaming circuitry, (ii) to receive, from the physical card scanner, digital identification of the physical player cards as they are physically dealt, (iii) to provide individualized electronic five-card draw poker gaming on each of the plurality of touchscreen gaming displays using the common initial cards and the common draw cards, and without using random number generators or pseudo-random number generators, and (iv) to assign draw values to each of the plurality of players that direct varied selection of the common draw cards to replace individualized discards from the common initial cards by the plurality of players, wherein the draw values are assigned without using random number generators or pseudo-random number generators, wherein each of the plurality of players has an individualized gaming outcome even though they receive the same common initial cards and the same common draw cards based on the individualized discards.

21. The electronic five-card draw poker gaming apparatus of claim 20, wherein the draw values comprise draw orders that designate starting cards from the common draw cards to replace the discards.

22. The electronic five-card draw poker gaming apparatus of claim 21, wherein the draw orders are assigned based on one or more of: a next available draw order for the five-card draw poker gaming circuitry, identifiers for the plurality of touchscreens, identifiers for the plurality of players, and user-selected values.

23. The electronic five-card draw poker gaming apparatus of claim 20, wherein the draw values comprise draw sequences that designate sequences of the common draw cards to replace the discards.

24. The electronic five-card draw poker gaming apparatus of claim 23, wherein the draw sequences are assigned based on one or more of: a next available draw order for the five-card draw poker gaming circuitry, identifiers for the plurality of touchscreens, identifiers for the plurality of players, and user-selected values.

25. The electronic five-card draw poker gaming apparatus of claim 20, wherein the electronic five-card draw poker gaming apparatus is permitted in jurisdictions where random number generators and pseudo-random number generators are prohibited from determining gaming outcomes.

26. The electronic five-card draw poker gaming apparatus of claim 20, wherein the portion of the plurality of touchscreen gaming displays are at one or more different locations within the same facility as the gaming table.

27. The electronic five-card draw poker gaming apparatus of claim 26, wherein the one or more different locations include gaming equipment within the facility that is not positioned at a gaming table.

* * * * *

UNITED STATES PATENT AND TRADEMARK OFFICE
CERTIFICATE OF CORRECTION

PATENT NO. : 10,198,913 B1
APPLICATION NO. : 15/687058
DATED : February 5, 2019
INVENTOR(S) : Stephen Deckoff and Tom W. Bowling, Jr.

Page 1 of 1

It is certified that error appears in the above-identified patent and that said Letters Patent is hereby corrected as shown below:

In the Claims

Column 27, Line 31, Claim 1, delete "porker" and insert -- poker --, therefor.

Column 30, Line 21, Claim 20, delete "porker" and insert -- poker --, therefor.

Signed and Sealed this
Third Day of March, 2020

Andrei Iancu
*Director of the United States Patent and Trademark Office*